US012537738B2

(12) United States Patent
Kawasaki

(10) Patent No.: US 12,537,738 B2
(45) Date of Patent: Jan. 27, 2026

(54) UE AND CONTROL APPARATUS IN CORE NETWORK

(71) Applicant: SHARP KABUSHIKI KAISHA, Sakai (JP)

(72) Inventor: Yudai Kawasaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 392 days.

(21) Appl. No.: 17/605,947

(22) PCT Filed: Apr. 24, 2020

(86) PCT No.: PCT/JP2020/017765
§ 371 (c)(1),
(2) Date: Oct. 22, 2021

(87) PCT Pub. No.: WO2020/218536
PCT Pub. Date: Oct. 29, 2020

(65) Prior Publication Data
US 2022/0200856 A1      Jun. 23, 2022

(30) Foreign Application Priority Data

Apr. 26, 2019   (JP) ................................. 2019-085768

(51) Int. Cl.
*H04L 41/0816*     (2022.01)
*H04L 41/50*       (2022.01)

(52) U.S. Cl.
CPC .......... *H04L 41/0816* (2013.01); *H04L 41/50* (2013.01)

(58) Field of Classification Search
CPC ........................... H04L 41/0816; H04L 41/50
(Continued)

(56) References Cited

U.S. PATENT DOCUMENTS

2012/0263036 A1* 10/2012 Barclay ................. H04L 47/245
370/230
2014/0341014 A1* 11/2014 Kim ........................ H04L 47/12
370/229

(Continued)

OTHER PUBLICATIONS

3GPP TS 24.501 V16.0.2 (Mar. 2019) Brd Generation Partnership Project; Technical Specification Group Core Network and Terminals; Non-Access-Stratum (NAS) protocol for 5G System (5GS); Stage 3 (Release 16).

(Continued)

*Primary Examiner* — Obaidul Huq
(74) *Attorney, Agent, or Firm* — ScienBiziP, P.C.

(57) ABSTRACT

A communication unit for implementing a function for CIOT in a 5GS and a communication unit for implementing a network initiated procedure of changing a state of a User Equipment (UE) are provided. The communication unit enables the funtion for CIOT in the 5GS that supports a configuration update procedure initiated by the network and multiple types of session and service continuity. Additionally, provided is a communication unit for a network initiated change of the state of the UE to a state in which user data communication via a control plane is restricted and to a state in which user data communication via the control plane is not restricted. The communication unit further manages a connection established between the UE and the network even in a case that a network initiated change of the state of the UE is performed.

4 Claims, 9 Drawing Sheets

(58) Field of Classification Search
USPC .......................................................... 370/254
See application file for complete search history.

(56) References Cited

U.S. PATENT DOCUMENTS

| | | | |
|---|---|---|---|
| 2019/0075601 A1* | 3/2019 | Cho | H04W 72/0446 |
| 2020/0037203 A1* | 1/2020 | Ianev | H04W 28/0289 |
| 2020/0092747 A1* | 3/2020 | Kumar | H04W 28/02 |
| 2021/0136658 A1* | 5/2021 | Rönneke | H04W 8/20 |

OTHER PUBLICATIONS

3GPP TS 23.502 V16.0.2 (Apr. 2019) 3rd Generation Partnership Project; Technical Specification Group Services and System Aspects; Procedures for the 5G System; Stage 2 (Release 16).
3GPP TS 23.501 V16.0.2 (Apr. 2019) 3rd Generation Partnership Project; Technical Specification Group Services and System Aspects; System Architecture for the 5G System; Stage 2 (Release 16).

* cited by examiner ue and control apparatus in core network

TECHNICAL FIELD

The present application relates to a UE and a control apparatus in a core network. This application claims the benefit of priority to JP 2019-085768 filed on Apr. 26, 2019, which is incorporated herein by reference in its entirety.

BACKGROUND ART

In the 3rd Generation Partnership Project (3GPP), study on system architecture of a 5G System (5GS) being a mobile communication system of the next generation, that is, the fifth generation (5G), has been started, and support of new procedures and new functions have been discussed (see NPL 1, NPL 2, and NPL 3).

For example, requirement conditions include optimization and diversification of communication procedures for supporting continual mobile communication services according to various services, optimization of system architecture in accordance with the optimization and the diversification of the communication procedures, and the like.

CITATION LIST

Non Patent Literature

NPL 1: 3GPP TS 23.501 v16.0.2; 3rd Generation Partnership Project; Technical Specification Group Services and System Aspects; System Architecture for the 5G System; Stage 2 (Release 16)

NPL 2: 3GPP TS 23.502 v16.0.2; 3rd Generation Partnership Project; Technical Specification Group Services and System Aspects; Procedures for the 5G System; Stage 2 (Release 16)

NPL 3: 3GPP TS 24.501 v16.0.2; 3rd Generation Partnership Project; Technical Specification Group Core Network and Terminals; Non-Access-Stratum (NAS) protocol for 5G System (5GS); Stage 3 (Release 16)

SUMMARY OF INVENTION

Technical Problem

In the 5G System (5GS), in order to provide various services, a 5G Core Network (5GC) being a new core network has been studied. In addition, study on functions for Cellular IoT (CIoT) (enhancing efficiency of a control signal, optimization of signaling for implementing efficient communication of user data such as small data and an SMS, and the like) supported in an Evolved Packet System (EPS) has been started as well.

Note that, in the 5GS, new functions are supported, including new procedures such as a configuration update procedure initiated by a network, multiple types of session and service continuity, connection to a Local Area Data Network (LADN), and the like. However, in a case that the functions for CIoT supported in the EPS are implemented in the 5GS, how the new procedures and new functions are used to implement the functions for CIoT supported in the EPS in the 5GS has not yet been clarified. In addition, also in the configuration update procedure initiated by a network being a new procedure, how the state of the User Equipment (UE) (terminal apparatus) is changed has not yet been clarified.

The present invention is made in the light of the circumstances as described above, and has an object to provide a method of implementing a function for CIoT in the 5GS and a method of implementing a procedure of changing the state of the UE as initiated by a network.

Solution to Problem

A User Equipment (UE) (terminal apparatus) according to an embodiment of the present invention includes: a transmission and/or reception unit; and a controller, the transmission and/or reception unit and the controller each being configured to receive a configuration update command message from a control apparatus in a core network in a UE configuration update procedure, wherein the UE configuration update procedure is a procedure initiated by the control apparatus in the core network, the controller starts, in a case that the configuration update command message includes a value of a back-off timer for restricting user data communication via a control plane and the back-off timer is not running, the back-off timer using the value of the back-off timer, and starts restriction of user data communication via the control plane.

A control apparatus in a core network according to an embodiment of the present invention includes a transmission and/or reception unit configured to transmit a configuration update command message to a User Equipment (UE) (terminal apparatus) in a UE configuration update procedure, wherein the UE configuration update procedure is a procedure initiated by the control apparatus in the core network, in order to start a back-off timer for restricting user data communication via a control plane in the UE, the transmission and/or reception unit includes a value of the back-off timer in the configuration update command message, and the transmission and/or reception unit stores the value of the back-off timer in association with the UE.

Advantageous Effects of Invention

According to an aspect of the present invention, even in a case that a 5GS supports a configuration update procedure initiated by a network and multiple types of session and service continuity, a function for CIoT can be used in 5GS. In addition, according to an aspect of the present invention, a state of a User Equipment (UE) (terminal apparatus) can be changed to a state in which user data communication via a control plane is restricted, and also the state can be changed to a state in which user data communication via the control plane is not restricted, as initiated by the network. In addition, according to an aspect of the present invention, connection can be appropriately managed also in a case that the state of the UE is changed as initiated by the network.

DESCRIPTION OF EMBODIMENTS

With reference to the drawings, the best embodiments for carrying out the present invention will be described.

1. Overview of System

Figure 1:
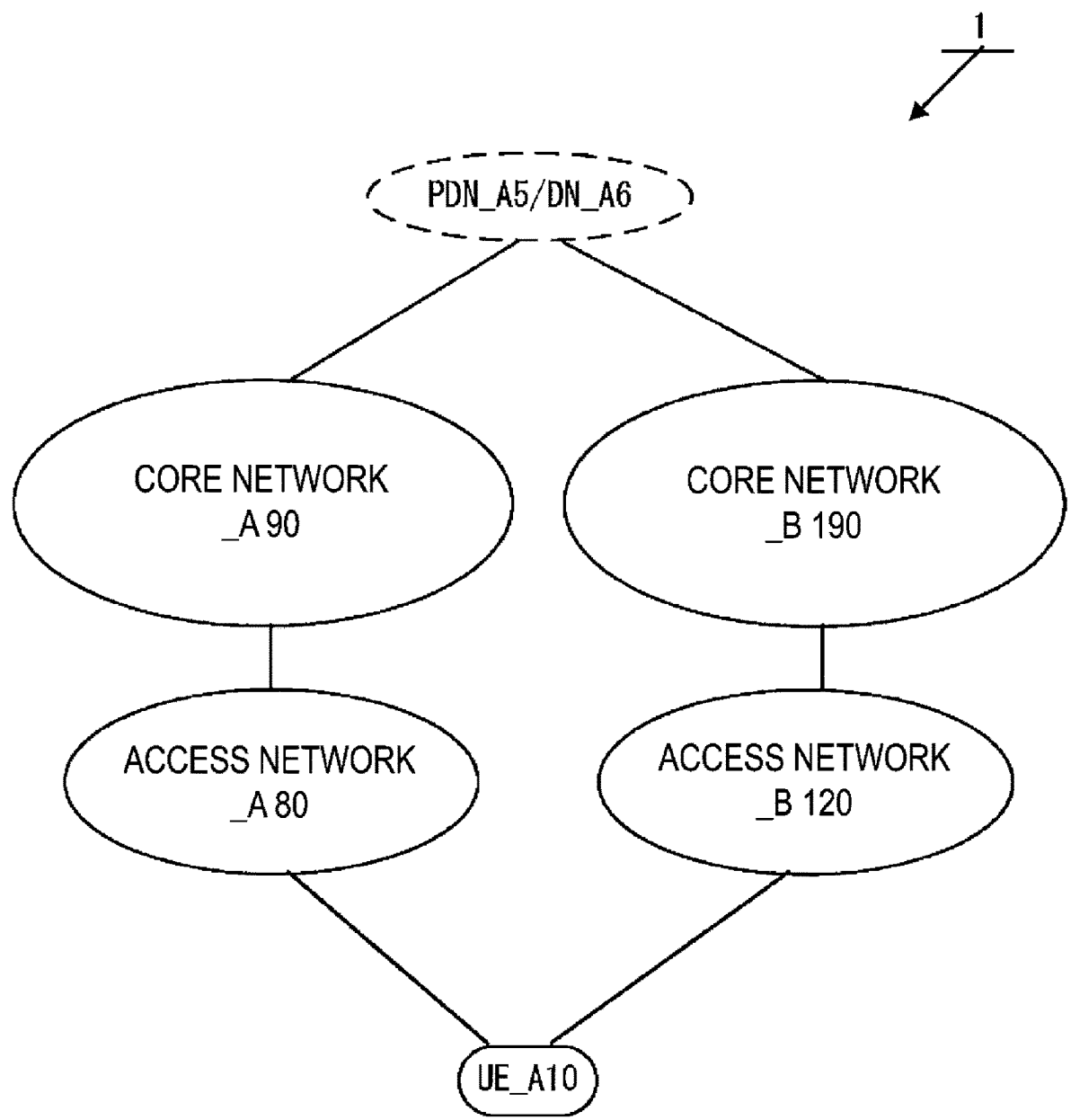
FIG. 1 is a diagram illustrating an outline of a mobile communication system (EPS/5GS).
Figure 2:
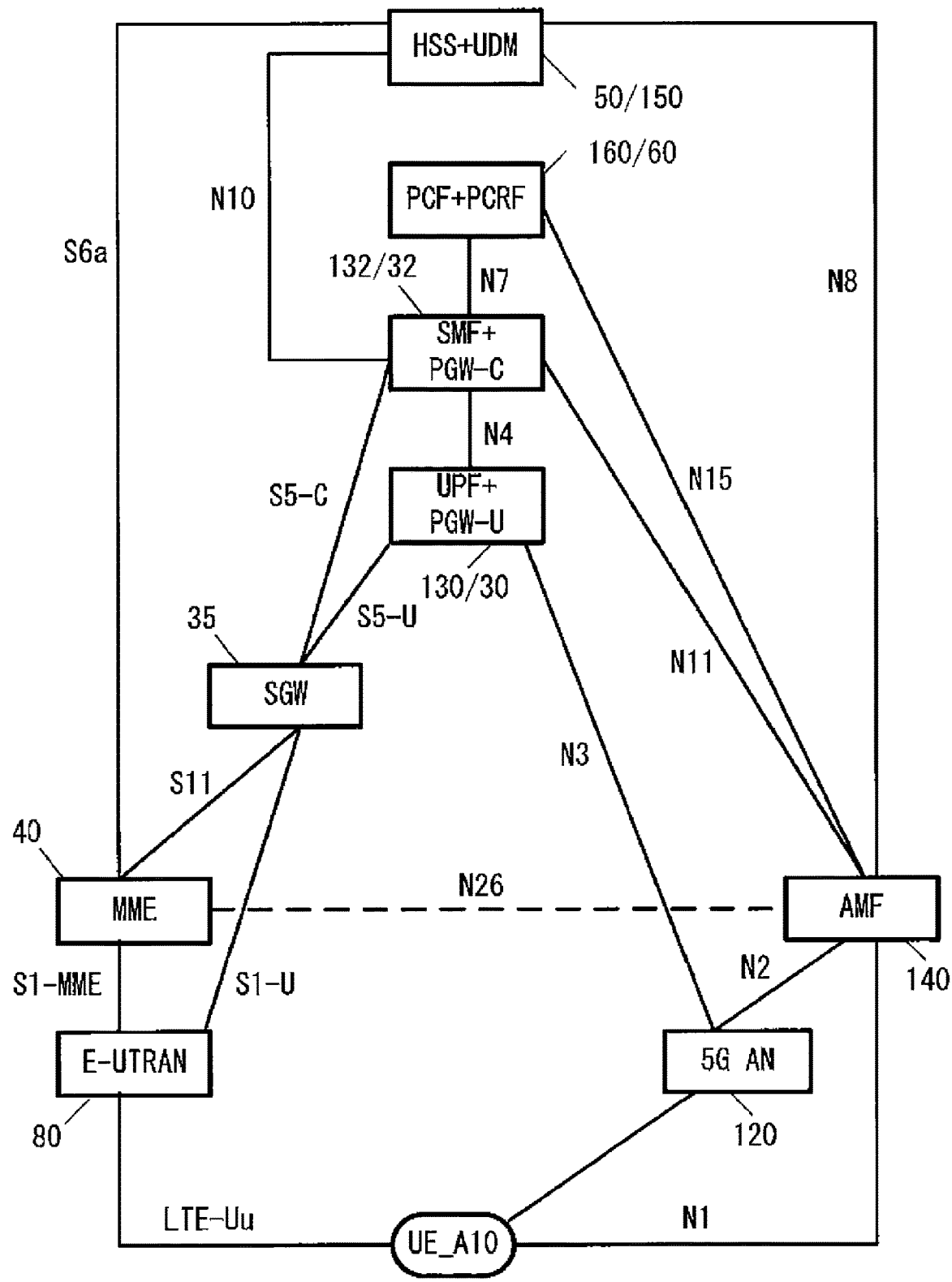
FIG. 2 is a diagram illustrating a detailed configuration of the mobile communication system (EPS/5GS).

First, FIG. 1 is a diagram for illustrating an outline of a mobile communication system 1 used in each embodiment, and FIG. 2 is a diagram for illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network _B 120, a core network_B 190, and a Data Network (DN)_A 6.

In the following, regarding these apparatuses and functions, the symbols may be omitted in description, such in as a UE_A, an access network_A, a core network_A, a PDN_A, an access network_B, a core network_B, and a DN_A. In addition, the UE_A 10 may be referred to as a UE, the access network_A 80 and/or the access network_B 120 may be referred to as an access network, the core network_A 90 and/or the core network_B 190 may be referred to as a core network, the PDN_A 5 may be referred to as a PDN, and the DN_A 6 may be referred to as a DN.

FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, and a UDM 150, and interfaces for connecting these apparatuses and functions to each other.

In the following, regarding these apparatuses and functions, the symbols may be omitted in description, such in as a UE_A, an E-UTRAN, an MME, an SGW, a PGW-U, a PGW-C, a PCRF, an HSS, a 5G AN, an AMF, a UPF, an SMF, a PCF, and a UDM. In addition, the UE_A 10 may be referred to as a UE.

Note that an Evolved Packet System (EPS) being a 4G system includes the access network_A and the core network_A. The EPS may further include the UE and/or the PDN. A 5G System (5GS) being a 5G system includes the UE, the access network_B, and the core network_B. The 5GS may further include the DN.

The UE is an apparatus that can connect to a network service via 3GPP access (also referred to as a 3GPP access network or a 3GPP AN) and/or non-3GPP access (also referred to as a non-3GPP access network or a non-3GPP AN). The UE may be a terminal apparatus capable of radio communication, such as a mobile phone and a smartphone, and may be a terminal apparatus that can connect to both the EPS and the 5GS. The UE may include a Universal Integrated Circuit Card (UICC) and an Embedded UICC (eUICC). Note that the UE may be referred to as a user equipment, or may be referred to as a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that, in the following, the symbol of the eNB 45 may be omitted in description, such in as an eNB. In a case that there are multiple eNBs, the eNBs are connected to each other via, for example, the X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that, in the following, the symbol of the gNB 122 may be omitted in description, such in as an eNB. The gNB is a node that provides a New Radio (NR) user plane and control plane to the UE, and is a node that connects to a 5GCN via the NG interface (including the N2 interface or the N3 interface). In other words, the gNB is a base station apparatus newly designed for the SGS, and has functions different from those of the base station apparatus (eNB) used in the EPS being the 4G system. In a case that there are multiple gNBs, the gNBs are connected to each other via, for example, the Xn interface.

In the following, the E-UTRAN and the NG-RAN may be referred to as 3GPP access. The radio LAN access network and the non-3GPP AN may be referred to as non-3GPP access. The nodes deployed in the access network B may also be collectively referred to as NG-RAN nodes.

In the following, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, the Mobility Management Entity (MME), the Serving Gateway (SGW), the Packet Data Network Gateway (PGW)-U, the PGW-C, the Policy and Charging Rules Function (PCRF), the Home Subscriber Server (HSS), and the like are deployed.

The core network_B corresponds to a 5G Core Network (5GCN). In the 5GCN, for example, the Access and Mobility Management Function (AMF), the User Plane Function (UPF), the Session Management Function (SMF), the Policy Control Function (PCF), the Unified Data Management (UDM), and the like are deployed. Here, the 5GCN may be referred to as a SGC.

In the following, the core network_A, and/or the core network_B, an apparatus included in the core network_A, and/or an apparatus included in the core network_B may be referred to as a core network or a core network apparatus.

The core network (the core network_A and/or the core network_B) may refer to an IP mobile communication network operated by a mobile communication operator (Mobile Network Operator (MNO)) connecting the access network (the access network_A and/or the access network_B) and the PDN and/or the DN, may refer to a core network for a mobile communication operator that operates and manages the mobile communication system 1, or may be a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however, the PDN and the DN may be different. The PDN may be a Data Network (DN) that provides communication services for the UE. Note that the DN may be configured as a packet data service network, or may be configured for each service. In addition, the PDN may include a connected communication terminal. Thus, "to be connected to the PDN" may be equivalent to "to be connected to a communication terminal and a server apparatus deployed in the PDN". In addition, "to transmit and/or receive user data to and/or from the PDN" may be equivalent to "to transmit and/or receive user data to and/or from a communication terminal and a server apparatus deployed in the PDN". Note that the PDN may be referred to as a DN, and the DN may be referred to as a PDN.

In the following, at least a part of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least a part of the access network_A, the core network_A, the PDN, the access network B, the core network B, and the DN, and/or one or more apparatuses included in these transmit and/or receive a message and/or perform a procedure".

The UE can connect to the access network. The UE can connect to the core network via the access network. In addition, the UE can connect to the PDN or the DN via the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. Non-IP communication refers to data communication not using the IP, and data is transmitted and/or received in a form different from the structure of the IP packets. For example, non-IP communication may be data communication implemented through transmission and/or reception of application data not provided with an IP header, or user data transmitted and/or received by the UE may be transmitted and/or received with the provision of another header such as a MAC header and an Ethernet (trade name) frame header.

In the following, regarding these apparatuses and functions, the symbols may be omitted in description, such in as a UE_A, a UEB, an access network_B, a core network_B, and a DN_A. In addition, the UE_A 10 and/or a UE_B 11 may be referred to as a UE or each UE, the access network_B 120 may be referred to as an access network, the core network_B 190 may be referred to as a core network, and the DN_A 6 may be referred to as a DN.

The UE_A and the UE_B may establish a PDU session via the same gNB, or may be in a state of establishing a PDU session via different gNBs. In addition, the UE_A and the UE B may establish a PDU session via the same UPF, or a PDU session may be established via different UPFs.

In addition, the UE_A and the UE B may be registered and managed in an apparatus in the same core network, or may be registered and managed in apparatuses in different core networks. Specifically, the UE_A and the UE B may be registered in the same AMF, or may be registered in different AMFs. In addition, regarding the UE_A and the UEB, a session may be managed by the same SMF, or a session may be managed by different SMFs. Regarding the UE_A and the UE B, registration and management of a session may be performed in an apparatus in another core network.

In a case that the UE_A and the UE B establish a PDU session via the same UPF, the UE_A and the UE B may perform private communication via the UPF without using the DN. In addition, in a case that the UE_A and the UE B establish a PDU session via different UPFs, private communication may be performed by using an interface between the UPFs.

In a case that the UE_A and the UE B are registered in the same AMF, management of the UE with the AMF belonging to group A may be performed. In a case that the UE_A and the UE B are registered in different AMFs, or also in a case that the UE_A and the UE B are registered in the same AMF, management of the UE with an apparatus in the core network other than the AMF belonging to group A may be performed.

In addition, the UE_A and the UE B may transmit and/or receive data by means of non-IP communication. For example, in a case that the UE_A and the UE_B implements a Vertical LAN using non-IP communication, by using the UPF as a HUB and a default router, the UE_A and the UE B may transmit and/or receive data using the Ethernet (trade name). Note that the UPF having a function such as a HUB and a default router may be a special UPF, and the UE_A and the UE B may establish a PDU session by using the UPF having the special function as a gateway.

In addition, the UE_A and/or the UE_B may have a function such as a HUB and a default router. In this case, the UE_A and/or UE B may transmit capability information indicating that the UE_A and/or the UE_B has the function of the HUB and the default router on a registration request message, and receive information indicating that a request has been accepted on a registration accept message and/or capability information of a network, and be thereby registered in the network as the default router in the group.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received via the N26 interface but also information transmitted and/or received without using the N26 interface can be stored.

2.1. Apparatus Configuration of UE

Figure 3:
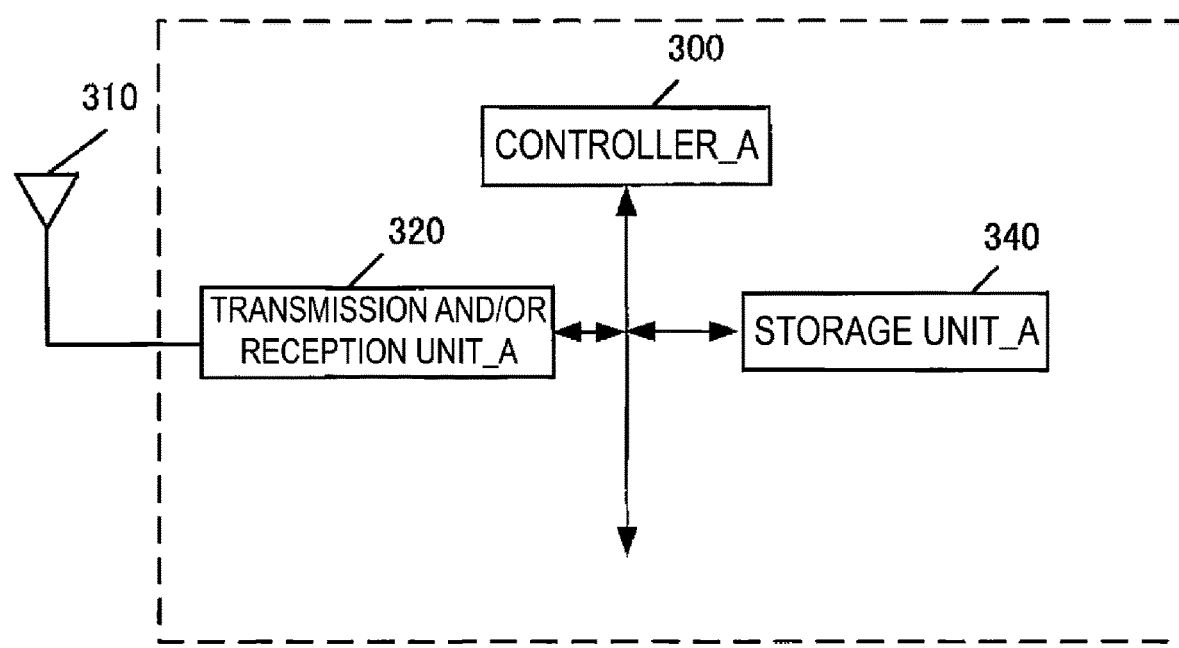
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Detailed description is given with reference to FIG. 2. With the use of the transmission and/or reception unit_A 320, the UE can communicate with the base station apparatus (eNB) in the E-UTRAN via the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF via the N1 interface with the use of the transmission and/or reception unit_A 320. Note that the N1 interface is a logical interface, and thus communication between the UE and the AMF is actually performed via the 5G AN.

The storage unit_A 340 is a function unit for storing programs, user data, control information, and the like necessary for each operation of the UE.

2.2. Apparatus Configuration of gNB

Figure 4:
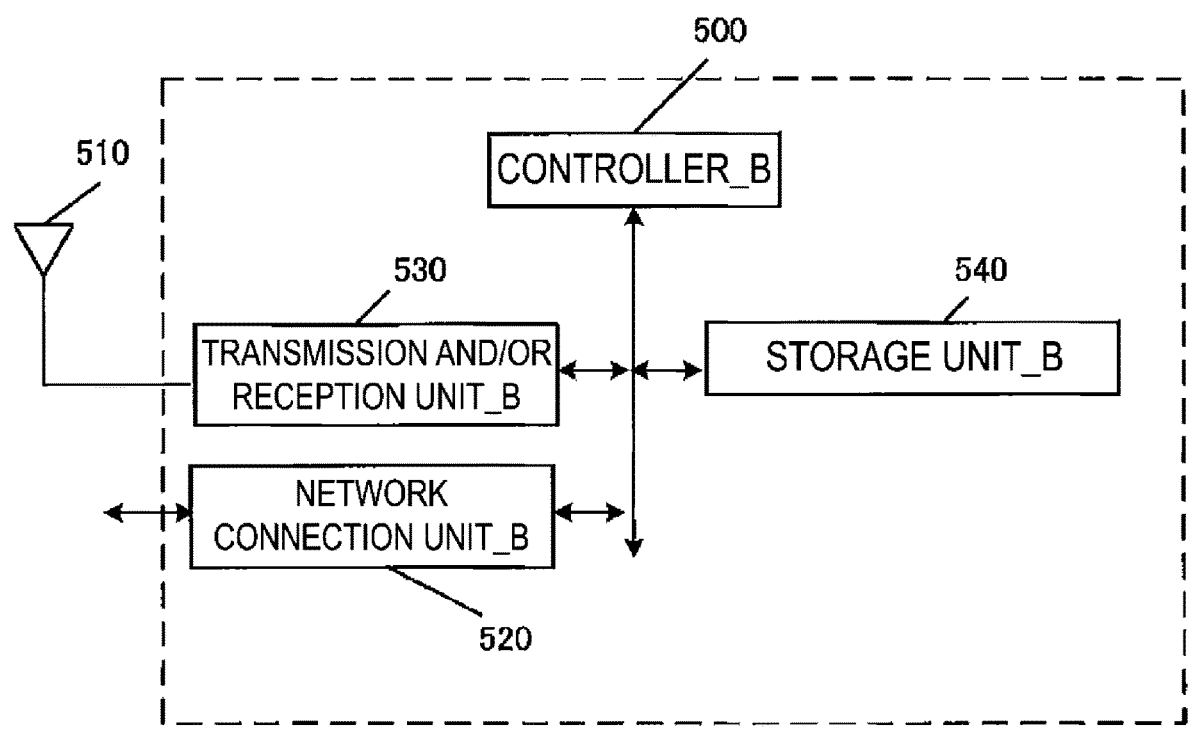
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Detailed description is given with reference to FIG. 2. With the use of the network connection unit_B 520, the gNB in the 5G AN can communicate with the AMF via the N2 interface and can communicate with the UPF via the N3 interface. The gNB can communicate with the UE with the use of the transmission and/or reception unit_B 530.

The storage unit_B 540 is a function unit for storing programs, user data, control information, and the like necessary for each operation of the gNB.

2.3. Apparatus Configuration of AMF

Figure 5:
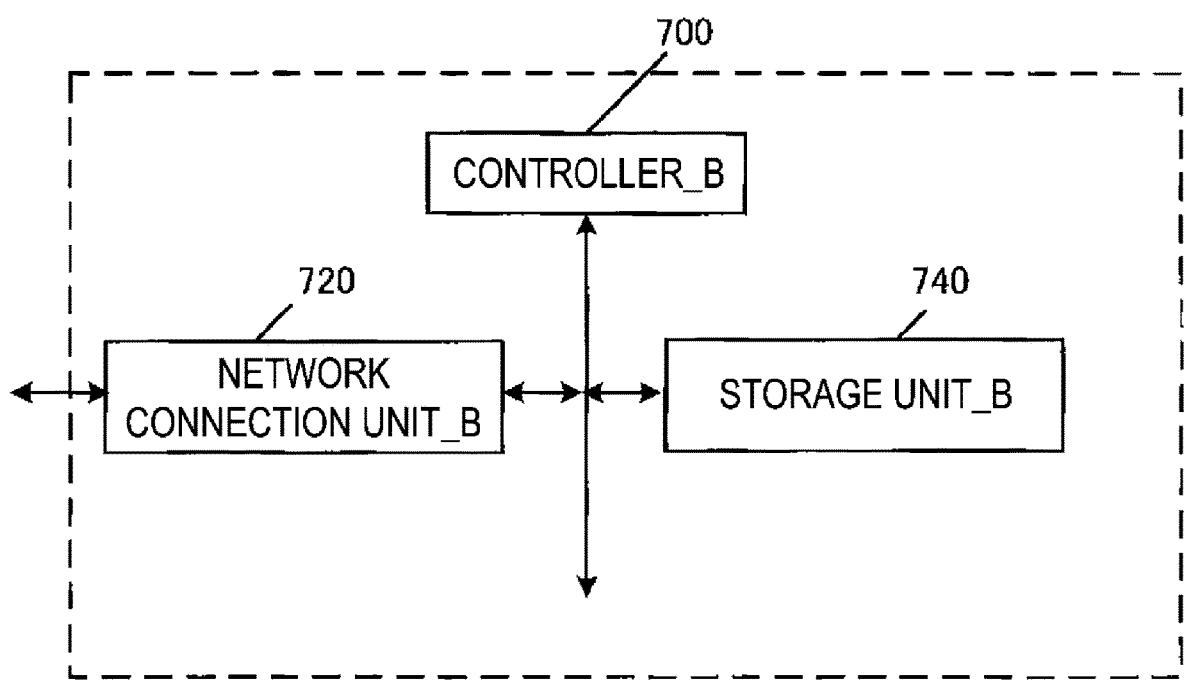
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB), and/or the SMF, and/or the PCF, and/or the UDM, and/or the SCEF in the 5G AN. In other words, with the use of the network connection unit_B 720, the AMF can transmit and/or receive user data and/or control information to and/or from the base station apparatus (gNB), and/or the SMF, and/or the PCF, and/or the UDM, and/or the SCEF in the 5G AN.

Detailed description is given with reference to FIG. 2. With the use of the network connection unit_A 620, the AMF in the 5GCN can communicate with the gNB via the N2 interface, can communicate with the UDM via the N8 interface, can communicate with the SMF via the N11 interface, and can communicate with the PCF via the N15 interface. The AMF can transmit and/or receive a NAS message to and/or from the UE via the N1 interface with the use of the network connection unit_A 620. Note that the N1 interface is a logical interface, and thus communication between the UE and the AMF is actually performed via the 5G AN. In a case that the AMF supports the N26 interface, the AMF can communicate with the MME via the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid position information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may start transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GIVIM context, may be a state in which the position information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GIVIM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core networkB. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS via non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Detailed description is given with reference to FIG. 2. With the use of the network connection unit_A 620, the SMF in the 5GCN can communicate with the AMF via the N11 interface, can communicate with the UPF via the N4 interface, can communicate with the PCF via the N7 interface, and can communicate with the UDM via the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF via the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB), and/or the SMF, and/or the DN in the 5G AN. In other words, with the use of the network connection unit_B 720, the UPF can transmit and/or receive user data and/or control information to and/or from the base station apparatus (gNB), and/or the SMF, and/or the DN in the 5G AN.

Detailed description is given with reference to FIG. 2. With the use of the network connection unit_A 620, the UPF in the 5GCN can communicate with the gNB via the N3 interface, can communicate with the SMF via the N4 interface, can communicate with the DN via the N6 interface, and can communicate with the another UPF via the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core networkB), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or may not have a function of converting non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received via the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions

Next, other apparatuses and/or functions will be described.

The PCF has a function of providing a policy rule and the like.

The UDM has an authentication information processing (Authentication credential processing) function, a user identification processing function, an access authentication function, a registration/mobility management function, a subscriber information management (subscription management) function, and the like.

The PCRF is connected to the PGW and/or the PDN, and has a function of performing QoS management for data delivery and the like. For example, the PCRF performs management of the QoS of a communication path between the UE_A 10 and the PDN. In addition, the PCRF may be an apparatus that creates and/or manages a Policy and Charging Control (PCC) rule and/or a routing rule used by each apparatus at the time of transmitting and/or receiving user data.

The HSS is connected to the MME and/or the SCEF, and has a function of performing management of subscriber information and the like. The subscriber information of the HSS is referred to in a case of, for example, access control of the MME. In addition, the HSS may be connected to a location management device different from the MME.

The SCEF is connected to the DN and/or the PDN, the MME, and the HSS, and has a function as a relay apparatus that transfers user data as a gateway connecting the DN and/or the PDN and the core network_A and the like. Note that the SCEF may be a gateway for non-IP communication. In addition, the SCEF may have a function of converting non-IP communication and IP communication. Multiple such gateways may be deployed in the core network_A. The SCEF may be configured either outside or inside the core network.

3. Description of Terms, Pieces of Identification Information, and Procedures Used in Each Embodiment Terms, pieces of identification information, and procedures, at least one of which is used in each embodiment, will be described in advance.

3.1. Description of Terms and Pieces of Identification Information Used in Each Embodiment First, highly technical terms and pieces of identification information used in procedures that are used in each embodiment will be described in advance.

A network refers to at least a part of the access network_B, the core network_B, and the DN. One or more apparatuses included in at least a part of the access network_B, the core network B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A session management (SM) message (also referred to as a Non-Access-Stratum (NAS) SM message) may be a NAS message used in a procedure for SM, or may be a control message transmitted and/or received between the UE_A 10 and the SMF A 230 via the AMF A 240. In addition, the SM message may include a PDU session establishment request message, a PDU session establishment accept message, a PDU session complete message, a PDU session reject message, a PDU session modification request message, a PDU session modification accept message, a PDU session modification response message, and the like. The procedure for SM may include a PDU session establishment procedure.

A 5G System (5GS) service may be a connection service provided using the core network_B 190. In addition, the 5GS service may be a service different from an EPS service, or may be a service similar to the EPS service.

A non 5GS service may be a service other than the 5GS service, and may include an EPS service and/or a non EPS service.

A single registration mode is a mode in which the UE_A 10 maintains a common registered state for the 5GMM state and an EMM state in a case that the UE_A 10 can use an N1 mode and an S1 mode.

A single registration mode is a mode in which the UE_A 10 maintains a common registered state for the 5GMM state and an EMM state in a case that the UE_A 10 can use an N1 mode and an S1 mode.

The S1 mode is a mode in which the UE_A 10 is allowed to access the EPC via the E-UTRAN. In other words, the S1 mode may be a mode in which a message is transmitted and/or received using the Si interface. Note that the Si interface may include the Sl-MME interface and the S1-U interface.

The N1 mode is a mode in which the UE_A 10 is allowed to access the 5GC via the 5G access network. In other words, the N1 mode may be a mode in which a message is transmitted and/or received using the N1 interface.

An Access Point Name (APN) may be identification information for identifying the core network and/or an external network such as the PDN. In addition, the APN can also be used as information for selecting a gateway such as the PGWA 30/UPF_A 235 connecting the core network A_90.

Regarding a Traffic Flow Template (TFT), the TFT indicates all of the packet filters associated with the EPS bearer. The TFT is information for identifying a part of user data to be transmitted and/or received, and the UE_A 10 transmits and/or receives the user data identified with the TFT by using the EPS bearer associated with the TFT. In addition, in other words, the UE_A 10 transmits and/or receives the user data identified with the TFT by using a Radio Bearer (RB) associated with the TFT. The TFT may associate user data to be transmitted and/or received, such as application data, with an appropriate transfer path, and may be identification information for identifying application data. The UE_A 10 may transmit and/or receive user data that cannot be identified with the TFT by using a default bearer. The UE_A 10 may store the TFT associated with the default bearer in advance.

A Packet Data Network (PDN) type indicates a type of PDN connection, and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

The EPS bearer is a logical communication path established between the UE and the PGW, and is a communication path constituting PDN connection. The EPS bearer includes a default bearer (also referred to as a default EPS bearer) and a dedicated bearer (also referred to as a dedicated EPS bearer).

The default bearer refers to an EPS bearer that is first established during the PDN connection, and only one default bearer can be established during one PDN connection. The default bearer is an EPS bearer that can be used for communication of user data not associated with the Traffic Flow Template (TFT).

The dedicated bearer refers to an EPS bearer that is established after the default bearer is established during the PDN connection, and one or more dedicated bearers can be established during one PDN connection. The dedicated bearer is an EPS bearer that can be used for communication of user data associated with the TFT.

A Protocol Data Unit/Packet Data Unit (PDU) session can be defined as a relationship between the DN that provides a PDU connectivity service and the UE; however, the PDU session may be connectivity established between the UE and an external gateway. In the 5GS, the UE establishes a PDU session via the access network B and the core network B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a TFT, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGWA 30/UPF_A 235 connecting the core network B 190. In addition, the DNN may correspond to an Access Point Name (APN).

A Protocol Data Unit/Packet Data Unit (PDU) session type indicates a type of PDU session, and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using Point-to-Point (P2P) tunneling technique. For the P2P tunneling technique, for example, UDP/IP encapsulation technique may be used. Note that the PDU session type may include the IP, in addition to the above. The IP can be specified in a case that the UE can use both of IPv4 and IPv6.

A network slice (NS) is a logical network that provides specific network capability and network characteristics. The UE and/or the network can support the network slice (NW slice (NS)) in the 5GS.

A network slice instance (NSI) includes a set of an instance (entity) of a network function (NF) and necessary resources, and forms a network slice to be allocated. Here, the NF is a processing function in a network, and is adopted or defined in 3GPP. The NSI is an entity of one or more NSs configured in the core network_B. The NSI may include a virtual Network Function (NF) generated using a Network Slice Template (NST). Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. The NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information specific to each Public Land Mobile Network (PLMN), or may be standard information common to PLMNs. The network may store one or more S-NSSAIs in the registration information of the UE as default S-NSSAI(s). Note that, in a case that the S-NSSAI is a default S-NSSAI, and the UE does not transmit to a network a valid S-NSSAI in a registration request message, the network may provide an NS related to the UE.

The Network Slice Selection Assistance Information (NSSAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF.

The Session and Service Continuity (SSC) mode indicates a mode of Session and Service Continuity supported by the system and/or each apparatus in the 5G system (5GS). More specifically, the SSC mode may be a mode indicating a type of session and service continuity supported by a PDU session that is established between the UE_A 10 and the UPF. Note that the SSC mode may be a mode indicating a type of session and service continuity configured for each PDU session. In addition, the SSC mode may include three modes, namely SSC mode 1, SSC mode 2, and SSC mode 3. Note that the SSC mode associated with the PDU session need not be changed while the PDU session continues.

SSC mode 1 is a mode in which the network maintains a connectivity service provided for the UE_A 10. Note that, in a case that the PDU session type associated with the PDU session is IPv4 or IPv6, the IP address may be maintained at the time of session and service continuity.

In addition, SSC mode 1 may be a mode of session and service continuity in which the same UPF is continuously maintained regardless of an access technology that is used in a case that the UE_A 10 connects to the network. More specifically, SSC mode 1 may be a mode in which session and service continuity is implemented without changing the UPF that is used as a PDU session anchor of an established PDU session, even in a case that there is occurrence of mobility of the UE_A 10.

SSC mode 2 is a mode in which the network releases a connectivity service provided for the UE_A 10 and its corresponding PDU session. Note that, in a case that the PDU session type associated with the PDU session is IPv4 or IPv6, the IP address allocated to the UE_A 10 may be released at the time of session and service continuity.

In addition, SSC mode 2 may be a mode for session and service continuity in which the same UPF is continuously maintained only within a serving area of the UPF. More specifically, SSC mode 2 may be a mode in which session and service continuity is implemented without changing the UPF that is used in an established PDU session, on the condition that the UE_A 10 is present within the serving area of the UPF. In addition, SSC mode 2 may be a mode in which session and service continuity is implemented with the UPF that is used in an established PDU session being changed, in a case that there is occurrence of such mobility of the UE_A 10 that the UE_A 10 exits the serving area of the UPF.

Here, the serving area of the UPF may refer to an area in which one UPF can provide a session and service continuity function, or may be a subset of RATs and access networks such as cells used in a case that the UE_A 10 connects to the network. In addition, the subset of access networks may be a network including one or multiple RATs and/or cells.

SSC mode 3 is a mode in which change of the user plane becomes known to the UE_A 10, with the network guaranteeing that connectivity will not be lost. Note that, in a case of SSC mode 3, in order to implement a better connectivity service, connection through a new PDU session anchor point may be established before the preceding connection is disconnected. In addition, in a case that the PDU session type associated with the PDU session is IPv4 or IPv6, the IP address need not be maintained at the time of session and service continuity for transfer of a PDU session anchor.

In addition, SSC mode 3 may be a mode of session and service continuity in which the same DN is allowed to establish a new PDU session and/or communication path via a new UPF before a PDU session and/or a communication path that has been established between the UE_A 10 and the UPF is disconnected. In addition, SSC mode 3 may be a mode of session and service continuity in which the UE_A 10 is allowed to be multi-homed. In addition, SSC mode 3 may be a mode in which session and service continuity using multiple PDU sessions and/or UPFs associated with the PDU sessions is allowed. In other words, in a case of SSC mode 3, each apparatus may implement session and service continuity using multiple PDU sessions, or may implement session and service continuity using multiple UPFs.

Here, in a case that each apparatus establishes a new PDU session and/or communication path, selection of a new UPF may be performed by the network, and the new UPF may be a UPF optimal for the location at which the UE_A 10 connects to the network. In addition, in a case that multiple PDU sessions and/or the UPFs used in the PDU sessions are valid, the UE_A 10 may associate an application and/or communication of flows with the newly established PDU sessions either immediately or based on completion of communication.

The default SSC mode is an SSC mode to be used by the UE_A 10 and/or the network in a case that a specific SSC mode is not determined. Specifically, the default SSC mode may be an SSC mode to be used by the UE_A 10 in a case that there is no request for the SSC mode from an application and/or a case that there is no policy of the UE_A 10 for determining the SSC mode for an application. The default SSC mode may be an SSC mode to be used by the network in a case that there is no request for the SSC mode from the UE_A 10.

Note that the default SSC mode may be configured for each PDN_A 5, or may be configured for each UE_A 10 and/or subscriber, based on subscriber information, and/or an operator policy, and/or a policy of the UE_A 10. In addition, the default SSC mode may be information indicating SSC mode 1, SSC mode 2, or SSC mode 3.

CIoT 5GS optimization is a function for Cellular IoT (CIoT) for supporting efficient communication of small data and a Short Message Service (SMS). Here, CIoT EPS optimization may be a function provided in the 5GS being the 5G system. CIoT 5GS optimization may include control plane CIoT 5GS optimization, user plane CIoT 5GS optimization, and Header compression for control plane CIoT 5GS optimization. In addition, CIoT 5GS optimization may include 5GMM-CONNECTED mode with RRC inactive indication.

Note that supporting CIoT 5GS optimization may mean one or more of control plane CIoT 5GS optimization, user plane CIoT 5GS optimization, Header compression for control plane 5GS EPS optimization, and 5GIVIM-CONNECTED mode with RRC inactive indication are supported. In addition, using CIoT 5GS optimization may mean that one or more of control plane CIoT 5GS optimization, user plane CIoT 5GS optimization, Header compression for control plane CIoT 5GS optimization, and 5GMM-CONNECTED mode with RRC inactive indication are used. In addition, supporting CIoT 5GS optimization may mean that coverage enhancement and/or use restriction of coverage enhancement is supported. In addition, using CIoT 5GS optimization may mean that coverage enhancement is used, or may mean that use of coverage enhancement is restricted.

In addition, CIoT EPS optimization in the EPS and CIoT 5GS optimization in the 5GS may support the same function, or may support different functions. In addition, CIoT EPS optimization in the 5GS may include a function provided in 5GMM-CONNECTED mode with RRC inactive indication.

Note that CIoT EPS optimization and CIoT 5GS optimization in the EPS and the 5GS may be provided as the same function. In this case, CIoT EPS optimization and CIoT 5GS optimization described in each embodiment may be interpreted as the same term so as to be provided. Here, the same term may be CIoT optimization, may be CIoT EPS optimization, or may be CIoT 5GS optimization.

Control plane CIoT 5GS optimization is a function for signaling optimization for enabling efficient communication of user data via the MME or the AMF on the control plane. Here, control plane CIoT 5GS optimization may be a function provided in the 5GS being the 5G system. In addition, in control plane CIoT 5GS optimization, in a case that IP data is communicated, a header compression function can be also used. In this case, the UE and the network may transmit and/or receive information indicating support of header compression for control plane CIoT 5GS optimization (Header compression for control plane CIoT EPS optimization) together with information indicating support of control plane CIoT 5GS optimization. In addition, in a case that the UE connects to a RAT for IoT, control plane CIoT 5GS optimization may be a requisite function.

Note that supporting control plane CIoT 5GS optimization may mean that communication of user data via the control plane is supported, or may mean that transmission and/or reception of user data that does not require establishment of a user plane radio bearer for transmitting and/or receiving user data is supported. In addition, using control plane CIoT 5GS optimization may mean that communication of user data via the control plane is performed, or may mean that user data is transmitted and/or received without establishing the user plane radio bearer.

In addition, control plane CIoT EPS optimization in the EPS and control plane CIoT 5GS optimization in the 5GS may be the same function, or may be different functions.

Note that control plane CIoT EPS optimization and control plane CIoT 5GS optimization in the EPS and the 5GS may be provided as the same function. In this case, control plane CIoT EPS optimization and control plane CIoT 5GS optimization described in each embodiment may be interpreted as the same term so as to be provided. Here, the same term may be control plane CIoT optimization, may be control plane CIoT EPS optimization, or may be control plane CIoT 5GS optimization.

User plane CIoT 5GS optimization is a function for signaling optimization for enabling efficient communication of user data on the user plane. Here, user plane CIoT 5GS optimization may be a function provided in the 5GS being the 5G system.

Note that supporting user plane CIoT 5GS optimization may mean that data communication using a user plane radio bearer for transmitting and/or receiving user data and the N3 interface are supported, and further, suspension and resumption of Non-Access Stratum (NAS) signaling are supported. In other words, supporting user plane CIoT 5GS optimization may mean that transition from the idle mode to the connected mode that does not require the Service request procedure is supported. In addition, using user plane CIoT 5GS optimization may mean that suspension and resumption of NAS signaling is performed, or may mean that transition from the idle mode to the connection mode that does not require the service request procedure is performed.

In addition, user plane CIoT EPS optimization in the EPS and user plane CIoT 5GS optimization in the 5GS may be the same function, or may be different functions. In addition, user plane CIoT 5GS optimization in the 5GS may be a function either equivalent to or different from the function provided in 5GMM-CONNECTED mode with RRC inactive indication.

Note that user plane CIoT EPS optimization and user plane CIoT 5GS optimization in the EPS and the 5GS may be provided as the same function. In this case, user plane CIoT EPS optimization and user plane CIoT 5GS optimization described in each embodiment may be interpreted as the same term so as to be provided. Here, the same term may be user plane CIoT optimization, may be user plane CIoT EPS optimization, or may be user plane CIoT 5GS optimization.

Header compression for control plane CIoT 5GS optimization refers to a header compression function. Here, the header compression function may be a function of compressing the size of the header of the IP protocol. Here, Header compression for control plane CIoT 5GS optimization may be a function provided in the 5GS being the 5G system. In addition, the header compression function may be implemented with a framework such as RObust Header Compression (ROHC). In addition, configuration information of the header compression function may be configured in a PDU session establishment procedure, or may be reconfigured in a PDU session update procedure (PDU session modification procedure).

Note that Header compression for control plane CIoT 5GS optimization may be a function supported in a case that control plane CIoT 5GS optimization is supported. In addition, Header compression for control plane CIoT 5GS optimization may be a function that can be used in a case that the PDU session type of a PDU session associated with control plane CIoT 5GS optimization is IPv4, IPv6, or IP.

Note that supporting Header compression for control plane CIoT 5GS optimization may mean that communication of user data using the header compression function is supported. In addition, using Header compression for control plane CIoT 5GS optimization may mean that communication of user data using the header compression function is performed.

In addition, Header compression for control plane CIoT EPS optimization in the EPS and Header compression for control plane CIoT 5GS optimization in the 5GS may be the same function, or may be different functions.

Note that Header compression for control plane CIoT EPS optimization and Header compression for control plane CIoT 5GS optimization in the EPS and the 5GS may be provided as the same function. In this case, Header compression for control plane CIoT EPS optimization and Header compression for control plane CIoT 5GS optimization described in each embodiment may be interpreted as the same term so as to be provided. Here, the same term may be Header compression for control plane CIoT optimization, may be Header compression for control plane CIoT EPS optimization, or may be Header compression for control plane CIoT 5GS optimization.

5GMM-CONNECTED mode with RRC inactive indication is a state indicating that the state of the NAS layer is a connected state although the RRC layer is in an inactive state. In other words, 5GIVIM-CONNECTED mode with RRC inactive indication is a state in which a radio bearer is released while NAS signaling connection and/or a context of the NAS signaling connection is maintained.

Note that supporting 5GMM-CONNECTED mode with RRC inactive indication may mean that maintaining of a state of the NAS layer in the connected state is supported even in a case that a notification indicating that the RRC layer has become inactive is received from a lower layer. In addition, using 5GMM-CONNECTED mode with RRC inactive indication may mean that the state of the NAS layer is maintained in the connected state even in a case that a notification indicating that the RRC layer has become inactive is received from a lower layer.

In addition, supporting 5GMM-CONNECTED mode with RRC inactive indication may mean that user plane CIoT 5GS optimization is supported. In addition, using 5GMM-CONNECTED mode with RRC inactive indication may mean that user plane CIoT 5GS optimization is used.

Coverage enhancement (enhanced coverage) is a function of expanding a coverage area provided by a radio base station. In a case that coverage enhancement is used, the UE can perform communication with the network in an area broader than that of the related art. In contrast, in a case that use of coverage enhancement is restricted, the UE cannot perform coverage enhancement, and can perform communication with the network in an area as that of the related art. Note that coverage enhancement may include mode A and mode B.

A back-off timer C is a timer that is operated in order to restrict communication of user data via the control plane. The back-off timer C may be a timer used for congestion control of communication of user data via the control plane.

In addition, the back-off timer C may be a timer that can be running only while the UE uses control plane CIoT 5GS optimization.

Note that the UE may be prohibited from performing communication of user data via the control plane while the back-off timer C is running. In contrast, the UE may be allowed to perform communication of user data via the control plane while the back-off timer C does not run.

A tracking area is a single or multiple areas that can be expressed using the position information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA).

A TA list is a list including one or multiple TAs allocated to the UE_A 10 by the network. Note that, in so far as the UE_A 10 moves within one or multiple TAs included in the TA list, the UE_A 10 may be able to move without performing a registration procedure and/or a tracking area update procedure. In other words, regarding the UE_A 10, the TA list may be an information group indicating an area in which the UE_A 10 can move without performing a registration procedure and/or a tracking area update procedure. Note that the TA list may be referred to as a TAI list including one or multiple Tracking area identities (TAIs). The TAI list may hereinafter refer to a TA list.

The LADN refers to a DN to which the UE can connect only at a specific location, and provides connectivity with respect to a specific DNN (that is, an LADN DNN).

LADN information is information related to the LADN. The LADN information may be information indicating a specific LADN that can be used by the UE. The LADN information may include an LADN DNN and LADN service area information. The LADN DNN may be information indicating an LADN, may be information indicating a DN regarded as an LADN, or may be a DNN used in a case that a PDU session is established with an LADN. In addition, the LADN service area information may be information indicating an LADN service area. In addition, the LADN service area information may be provided as a set of tracking areas, or may be provided as a Tracking area identity (TAI) list.

Note that the LADN service area may be an area in which establishment of a PDU session with an LADN can be performed, or may be an area in which connection to the LADN can be performed.

A PDU session for the LADN (PDU session for LADN) is a PDU session associated with a DNN associated with the LADN. The PDU session for the LADN may be a PDU session established with the LADN. In other words, the PDU session for the LADN may be a PDU session established between the UE and the LADN, or may be a PDU session used for user data communication between the UE and the LADN. Note that the PDU session for the LADN may be a PDU session that can be established only in the LADN service area.

A Narrowband IoT (NB-IoT) is a Radio Access Technology (RAT) with a restricted band. NB-IoT may be a RAT for providing a communication service for an IoT terminal, or may be a RAT with its part of functions being restricted. In addition, NB-IoT may be a RAT constituting the E-UTRAN. Note that a RAT constituting the E-UTRAN other than NB-IoT may be a WB-E-UTRAN. In addition, a mode of the UE for connecting to the core network and/or the DN using NB-IoT may be referred to as an NB-N1 mode. In addition, a mode of the UE for connecting to the core network and/or the DN using a RAT other than NB-IoT, by contrast, may be referred to as a WB-N1 mode.

The 1st identification information is information indicating a request for CIoT 5GS optimization from the UE. The 1st identification information may be a PNB-CIoT bit (Preferred CIoT network behaviour). Note that the PNB-CIoT bit may be a bit indicating control plane CIoT 5GS optimization, or may be a bit indicating a request for control plane CIoT 5GS optimization. In addition, the PNB-CIoT bit may be a bit indicating user plane CIoT 5GS optimization, or may be a bit indicating a request for user plane CIoT 5GS optimization. In addition, the PNB-CIoT bit may be a bit constituting an Additional update type information element.

In addition, the 1st identification information may be information selected and determined based on a configuration of the UE, and/or a state of the UE, and/or a user policy, and/or a request of an application.

The 2nd identification information is information indicating whether or not the UE supports control plane CIoT 5GS optimization. The 2nd identification information may be a CP CIoT bit (Control plane CIoT 5GS optimization). Note that the CP CIoT bit may be a bit indicating that control plane CIoT 5GS optimization is supported (Control plane CIoT 5GS optimization supported). In addition, the CP CIoT bit may be a bit constituting a 5GMM capability information element indicating a capability of the UE in 5G.

In addition, the 2nd identification information may be information selected and determined based on a configuration of the UE, and/or a state of the UE, and/or a user policy, and/or a request of an application.

The 3rd identification information is information indicating whether or not the UE supports user plane CIoT 5GS optimization. The 3rd identification information may be a UP CIoT bit (User plane CIoT 5GS optimization). Note that the UP CIoT bit may be a bit indicating that user plane CIoT 5GS optimization is supported (User plane CIoT 5GS optimization supported). In addition, the UP CIoT bit may be a bit constituting a 5GMM capability information element indicating a capability of the UE in 5G.

In addition, the 3rd identification information may be information selected and determined based on a configuration of the UE, and/or a state of the UE, and/or a user policy, and/or a request of an application.

The 4th identification information is information indicating whether or not the UE supports data communication using a communication path of the user plane. The 4th identification information may be information indicating that the UE supports data communication using the N3 interface being an interface between the gNB and the UPF. In addition, the 4th identification information may be an N3 data bit (N3 data transfer). Note that the N3 data bit may be a bit indicating that data communication using the N3 interface is supported (N3 data transfer supported). In addition, the N3 data bit may be a bit constituting a 5GMM capability information element indicating a capability of the UE in 5G.

In addition, the 4th identification information may be information selected and determined based on a configuration of the UE, and/or a state of the UE, and/or a user policy, and/or a request of an application.

The 5th identification information is information indicating whether or not the UE supports Header compression for control plane CIoT 5GS optimization. The 5th identification information may be an HC-CP CIoT bit (Header compression for control plane CIoT 5GS optimization). Note that the HC-CP CIoT bit may be a bit indicating that Header compression for control plane CIoT 5GS optimization is supported (Header compression for control plane CIoT 5GS optimization supported). In addition, the HC-CP CIoT bit may be a bit constituting a 5GMM capability information element indicating a capability of the UE in 5G.

In addition, the 5th identification information may be information selected and determined based on a configuration of the UE, and/or a state of the UE, and/or a user policy, and/or a request of an application.

The 6th identification information is information indicating whether or not the UE supports use restriction of coverage enhancement (enhanced coverage). In other words, the 6th identification information may be information indicating whether or not the UE supports use of coverage enhancement. In addition, the 6th identification information may be a RestrictEC bit (Restriction on use of enhanced coverage support). Note that the RestrictEC bit may be a bit indicating that use restriction of coverage enhancement is supported (Restriction on use of enhanced coverage supported). In addition, the RestrictEC bit may be a bit constituting a 5GMM capability information element indicating a capability of the UE in 5G.

In addition, the 6th identification information may be information selected and determined based on a configuration of the UE, and/or a state of the UE, and/or a user policy, and/or a request of an application.

The 7th identification information is information indicating whether or not the UE supports 5GMM-CONNECTED mode with RRC inactive indication. The 7th identification information may be capability information indicating that the UE can transition between 5GMM-CONNECTED mode with RRC inactive indication and the 5GMM-CONNECTED mode, based on a notification from a lower layer.

Note that the 7th identification information may be identification information indicating the same meaning as the 3rd identification information. In addition, in a case that the 3rd identification information and the 7th identification information indicate the same meaning, only one of the 3rd identification information and the 7th identification information may be transmitted and/or received.

In addition, the 7th identification information may be information selected and determined based on a configuration of the UE, and/or a state of the UE, and/or a user policy, and/or a request of an application.

The 8th identification information is an NSSAI requested by the UE. The 8th identification information may be information including one or multiple S-NSSAIs. In addition, the 8th identification information may be information including one or multiple S-NSSAIs associated with the NSI supporting one or more functions out of the functions indicated by the 1st identification information to the 7th identification information.

In addition, the 8th identification information may include information of association between each S-NSSAI and each function indicated by the 1st identification information to the 7th identification information. In addition, the 8th identification information may include information indicating which function out of the functions indicated by the 1st identification information to the 7th identification information is supported by each NSI.

In addition, the 8th identification information may be information selected and determined based on a configuration of the UE, and/or a state of the UE, and/or a user policy, and/or a request of an application.

The 101st identification information is information indicating whether or not the UE supports a back-off timer for communication of user data via the control plane. The 101st identification information may be a CP backoff bit (Control plane data backoff support). Note that the CP backoff bit may be a bit indicating that a back-off timer for communication of user data via the control plane is supported (back-off timer for transport of user data via the control plane supported). In addition, the CP backoff bit may be a bit constituting a 5GMM capability information element indicating a capability of the UE in 5G. Here, the back-off timer for communication of user data via the control plane may be the back-off timer C.

In addition, the 101st identification information may be information selected and determined based on a configuration of the UE, and/or a state of the UE, and/or a user policy, and/or a request of an application.

The 21st identification information is information indicating that a request for CIoT 5GS optimization from the UE is accepted. The 21st identification information may be an ANB-CIoT bit (Accepted CIoT network behaviour). Note that the ANB-CIoT bit may be a bit indicating control plane CIoT 5GS optimization, or may be a bit indicating a request for control plane CIoT 5GS optimization. In addition, the ANB-CIoT bit may be a bit indicating user plane CIoT 5GS optimization, or may be a bit indicating a request for user plane CIoT 5GS optimization. In addition, the ANB-CIoT bit may be a bit constituting an Additional update result information element.

In addition, the 21st identification information may be information selected and determined based on one or more pieces of identification information out of the 1st identification information to the 3rd identification information received by the network, and/or information associated with the NSI, and/or capability information of the network, and/or an operator policy, and/or a state of the network, and/or registration information of a user, and/or the like.

The 22nd identification information is information indicating whether or not the network supports control plane CIoT 5GS optimization. The 22nd identification information may be a CP CIoT bit (Control plane CIoT 5GS optimization). Note that the CP CIoT bit may be a bit indicating that control plane CIoT 5GS optimization is supported (Control plane CIoT 5GS optimization supported). In addition, the CP CIoT bit may be a bit constituting a 5GS network function support information element (5GS network feature support information element). In addition, the CP CIoT bit may be a bit constituting a 5GMM network function support information element (5GMM network feature support information element) indicating a capability of the network in 5G. In addition, the 22nd identification information may be information indicating that the network has accepted use of control plane CIoT 5GS optimization.

In addition, the 22nd identification information may be information selected and determined based on one or more pieces of identification information out of the 1st identification information to the 3rd identification information received by the network, and/or information associated with the NSI, and/or capability information of the network, and/or an operator policy, and/or a state of the network, and/or registration information of a user, and/or the like.

The 23rd identification information is information indicating whether or not the network supports user plane CIoT 5GS optimization. The 23rd identification information may be a UP CIoT bit (User plane CIoT 5GS optimization). Note that the UP CIoT bit may be a bit indicating that user plane CIoT 5GS optimization is supported (User plane CIoT 5GS optimization supported). In addition, the UP CIoT bit may be a bit constituting a 5GS network function support information element (5GS network feature support information element). In addition, the UP CIoT bit may be a bit constituting a 5GMM network function support information element (5GMM network feature support information element) indicating a capability of the network in 5G. In addition, the 23rd identification information may be information indicating that the network has accepted use of user plane CIoT 5GS optimization.

In addition, the 23rd identification information may be information selected and determined based on one or more pieces of identification information out of the 1st identification information to the 3rd identification information received by the network, and/or information associated with the NSI, and/or capability information of the network, and/or an operator policy, and/or a state of the network, and/or registration information of a user, and/or the like.

The 24th identification information is information indicating whether or not the network supports data communication using a communication path of the user plane. The 24th identification information may be information indicating that the network supports data communication using the N3 interface being an interface between the gNB and the UPF. In addition, the 24th identification information may be an N3 data bit (N3 data transfer). Note that the N3 data bit may be a bit indicating that data communication using the N3 interface is supported (N3 data transfer supported). In addition, the N3 data bit may be a bit constituting a 5GMM network function support information element (5GMM network feature support information element) indicating a capability of the network in 5G. In addition, the 24th identification information may be information indicating that the network has accepted data communication using the N3 interface.

In addition, the 23rd identification information and/or the 24th identification information may be identification information indicating that a communication path of the user plane is established, or may be identification information indicating that establishment of a communication path of the user plane can be performed, while the network uses user data communication using control plane CIoT 5GS optimization.

In addition, the 24th identification information may be information selected and determined based on the 4th identification information received by the network, and/or information associated with the NSI, and/or capability information of the network, and/or an operator policy, and/or a state of the network, and/or registration information of a user, and/or the like.

The 25th identification information is information indicating whether or not the network supports Header compression for control plane CIoT 5GS optimization. The 25th identification information may be an HC-CP CIoT bit (Header compression for control plane CIoT 5GS optimization). Note that the HC-CP CIoT bit may be a bit indicating that Header compression for control plane CIoT 5GS optimization is supported (Header compression for control plane CIoT 5GS optimization supported). In addition, the HC-CP CIoT bit may be a bit constituting a 5GS network function support information element (5GS network feature support information element). In addition, the HC-CP CIoT bit may be a bit constituting a 5GMM network function support information element (5GMM network feature support information element) indicating a capability of the network in 5G. In addition, the 25th identification information may be information indicating that the network has accepted use of Header compression for control plane CIoT 5GS optimization.

In addition, the 25th identification information may be information selected and determined based on the 5th identification information received by the network, and/or information associated with the NSI, and/or capability information of the network, and/or an operator policy, and/or a state of the network, and/or registration information of a user, and/or the like.

The 26th identification information is information indicating whether or not the network restricts use of coverage enhancement. In other words, the 26th identification information may be information indicating whether or not the network allows use of coverage enhancement. In addition, the 26th identification information may be a RestrictEC bit (Restriction on enhanced coverage). Note that the RestrictEC bit may be a bit indicating that use of coverage enhancement is restricted (Use of enhanced coverage is restricted), or may be a bit indicating that use of coverage enhancement is not restricted (Use of enhanced coverage is not restricted). In addition, the RestrictEC bit may be a bit constituting a 5GMM network function support information element (5GMM network feature support information element) indicating a capability of the network in 5G. In addition, the 26th identification information may be information indicating that the network has accepted use of coverage enhancement.

In addition, the 26th identification information may be information selected and determined based on the 26th identification information received by the network, and/or information associated with the NSI, and/or capability information of the network, and/or an operator policy, and/or a state of the network, and/or registration information of a user, and/or the like.

The 27th identification information is information indicating whether or not the network supports 5GMM-CONNECTED mode with RRC inactive indication. The 27th identification information may be capability information indicating that the network can manage transition of the UE between 5GMM-CONNECTED mode with RRC inactive indication and the 5GMM-CONNECTED mode, based on a notification from a lower layer. In addition, the 27th identification information may be information indicating that the network has accepted use for 5GMM-CONNECTED mode with RRC inactive indication.

Note that the 27th identification information may be identification information indicating the same meaning as the 23rd identification information. In addition, in a case that the 23rd identification information and the 27th identification information indicate the same meaning, only one of the 23rd identification information and the 27th identification information may be transmitted and/or received.

In addition, the 27th identification information may be information selected and determined based on the 7th identification information received by the network, and/or information associated with the NSI, and/or capability information of the network, and/or an operator policy, and/or a state of the network, and/or registration information of a user, and/or the like.

The 28th identification information is an NSSAI accepted by the network. The 28th identification information may be information including one or multiple S-NSSAIs. In addition, the 28th identification information may be information including one or multiple S-NSSAIs associated with the NSI supporting one or more functions out of the functions indicated by the 22nd identification information to the 27th identification information. In addition, the 28th identification information may be information including one or multiple S-NSSAIs associated with the NSI gaining acceptance of use of one or more functions out of the functions indicated by the 22nd identification information to the 27th identification information.

In addition, the 28th identification information may include information of association between each S-NSSAI and each function indicated by the 22nd identification information to the 27th identification information. In addition, the 28th identification information may include information indicating which function out of the functions indicated by the 22nd identification information to the 27th identification information is supported by each NSI, or may include information indicating use of which function is accepted for each NSI.

In addition, the 28th identification information may be information selected and determined based on the 8th identification information received by the network, and/or information associated with the NSI, and/or capability information of the network, and/or an operator policy, and/or a state of the network, and/or registration information of a user, and/or the like.

Note that, in a case that the UE is an IoT terminal, the number of S-NSSAIs included in the NSSAI indicated by the 28th identification information may be only one. In other words, in a case that the UE is an IoT terminal, the 28th identification information may include a single S-NSSAI.

The 111th identification information is a value of the back-off timer C. The 111th identification information may be information indicating a time period during which the back-off timer C is operated. In other words, the 111th identification information may be information indicating a time period during which communication of user data via the control plane is restricted.

In addition, the 111th identification information may be information for commanding start of operation of the back-off timer C, or may be information for commanding continuation of operation of the back-off timer C. In other words, the 111th identification information may be information indicating that restriction of communication of user data via the control plane is started, or may be information indicating that restriction of communication of user data via the control plane continues.

In addition, the 111th identification information may be information that is transmitted and/or received in a case that each apparatus supports control plane CIoT 5GS optimization. In other words, the 111th identification information may be information that is transmitted and/or received in a case that each apparatus supports communication of user data via the control plane.

In addition, the 111th identification information may be information that is transmitted and/or received in a case that the UE supports the back-off timer for communication of user data via the control plane. In other words, the 111th identification information may be information that is transmitted and/or received in a case that the UE sends out a notification that the UE supports the back-off timer for communication of user data via the control plane.

In addition, the 111th identification information may be information selected and determined based on the 1st identification information, and/or the 2nd identification information, and/or the 101st identification information received by the network, and/or information associated with the NSI, and/or capability information of the network, and/or an operator policy, and/or a state of the network, and/or registration information of a user, and/or the like.

In addition, the 111th identification information may be information that is transmitted and/or received together with information indicating that the 111th identification information is a value of the back-off timer C. In other words, each apparatus may transmit and/or receive the 111th identification information together with information for identifying the 111th identification information.

The 112th identification information is information indicating a range to which restriction of communication of user data via the control plane is applied. Here, the range to which restriction of communication of user data via the control plane is applied may be all of the PLMNs, or may be only the current PLMN. In addition, the range to which restriction of communication of user data via the control plane is applied may be the current registration area, or may be the current tracking area. In addition, the range to which restriction of communication of user data via the control plane is applied may be an area configured by the network.

In addition, the 112th identification information may be information that is transmitted and/or received in a case that each apparatus supports control plane CIoT 5GS optimization. In other words, the 112th identification information may be information that is transmitted and/or received in a case that each apparatus supports communication of user data via the control plane.

In addition, the 112th identification information may be information that is transmitted and/or received in a case that the UE supports the back-off timer for communication of user data via the control plane. In other words, the 112th identification information may be information that is transmitted and/or received in a case that the UE sends out a notification that the UE supports the back-off timer for communication of user data via the control plane.

In addition, the 112th identification information may be information that is transmitted and/or received in a case that the 111th identification information is transmitted and/or received. In other words, the 112th identification information may be information that is transmitted and/or received together with the 111th identification information.

In addition, the 112th identification information may be information selected and determined based on the 1st identification information, and/or the 2nd identification information, and/or the 101st identification information received by the network, and/or information associated with the NSI, and/or capability information of the network, and/or an operator policy, and/or a state of the network, and/or registration information of a user, and/or the like.

The 41st identification information is information indicating that a communication path whose establishment is requested is a communication path in which only control plane CIoT 5GS optimization can be used. The 41st identification information may be information indicating that the communication path whose establishment is requested is a communication path that cannot be mapped to the communication path of the user plane. In addition, the 41st identification information may be information indicating that the communication path whose establishment is requested is a communication path to be released in a case that control plane CIoT 5GS optimization can no longer be used. In addition, the 41st identification information may be information indicating that each apparatus cannot map user data communication associated with the communication path whose establishment is requested to the communication path of the user plane. Note that the communication path may be a PDU session.

In addition, the 41st identification information may be information selected and determined based on a configuration of the UE, and/or a state of the UE, and/or a user policy, and/or a request of an application.

The 42nd identification information is an S-NSSAI requested by the UE. The 42nd identification information may be an S-NSSAI associated with the NSI gaining acceptance of use of one or more functions out of the functions indicated by the 22nd identification information to the 27th identification information.

In addition, the 42nd identification information may be information selected and determined based on the 21st identification information to the 28th identification information, and/or a configuration of the UE, and/or a state of the UE, and/or a user policy, and/or a request of an application.

The 43rd identification information is information indicating an SSC mode. The 43rd identification information may be information indicating an SSC mode requested by the UE_A 10. More specifically, the 43rd identification information may be information indicating an SSC mode that is requested by the UE_A 10 and that is associated with a PDU session established in the present procedure. Note that the 43rd identification information may be information indicating SSC mode 1, may be information indicating SSC mode 2, or may be information indicating SSC mode 3.

In addition, the 43rd identification information may be information selected and determined based on the 21st identification information to the 28th identification information, and/or a configuration of the UE, and/or a state of the UE, and/or a user policy, and/or a request of an application.

The 51st identification information is information indicating that a communication path to be established is a communication path in which only control plane CIoT 5GS optimization can be used. The 51st identification information may be information indicating that the communication path to be established is a communication path that cannot be mapped to the communication path of the user plane. In addition, the 51st identification information may be information indicating that the communication path to be established is a communication path to be released in a case that control plane CIoT 5GS optimization can no longer be used. In addition, the 51st identification information may be information indicating that each apparatus cannot map user data communication associated with the communication path to be established to the communication path of the user plane. Note that the communication path may be a PDU session.

In addition, the 51st identification information may be information selected and determined based on the 41st identification information received by the network, and/or information associated with the NSI, and/or capability information of the network, and/or an operator policy, and/or a state of the network, and/or registration information of a user, and/or the like.

The 52nd identification information is an S-NSSAI selected by the network. The 52nd identification information may be an S-NSSAI associated with the NSI allowed to be used by the network. In addition, the 52nd identification information may be an S-NSSAI associated with the NSI gaining acceptance of use of one or more functions out of the functions indicated by the 22nd identification information to the 27th identification information.

In addition, the 52nd identification information may be information selected and determined based on the 42nd identification information received by the network, and/or information associated with the NSI, and/or capability information of the network, and/or an operator policy, and/or a state of the network, and/or registration information of a user, and/or the like.

The 53rd identification information is information indicating an SSC mode. The 53rd identification information may be information indicating an SSC mode selected by the network. More specifically, the 53rd identification information may be information indicating an SSC mode that is selected by the network and that is associated with a PDU session established in the present procedure. Note that the selected SSC mode may be SSC mode 1, may be SSC mode 2, or may be SSC mode 3. In addition, the selected SSC mode may be an SSC mode determined in a unit of an APN and/or in a unit of a PDN type, or may be the default SSC mode.

In addition, the 53rd identification information may be information selected and determined based on the 43rd identification information received by the network, and/or information associated with the NSI, and/or capability information of the network, and/or an operator policy, and/or a state of the network, and/or registration information of a user, and/or the like.

The 61st identification information is new information of CIoT 5GS optimization. The 61st identification information may be information indicating that CIoT 5GS optimization in use needs to be changed. In addition, the 61st identification information may be information indicating changed CIoT 5GS optimization. In addition, the 61st identification information may be information indicating CIoT 5GS optimization that is different from CIoT 5GS optimization currently in use. In other words, the 61st identification information may be information indicating CIoT 5GS optimization that is different from CIoT 5GS optimization indicated by the previously transmitted and/or received 21st identification information. Note that CIoT 5GS optimization may be control plane CIoT 5GS optimization, or may be user plane CIoT 5GS optimization.

In addition, the 61st identification information may be information selected and determined based on one or more pieces of identification information out of the 1st identification information to the 3rd identification information, the 21st identification information to the 23rd identification information, and the 21st identification information to the 23rd identification information previously transmitted and/or received by the network, and/or information associated with the NSI, and/or capability information of the network, and/or an operator policy, and/or a state of the network, and/or registration information of a user, and/or the like. In addition, the 61st identification information may be information similar to the information indicated by the 21st identification information.

The 62nd identification information is new support information of control plane CIoT 5GS optimization. The 62nd identification information may be information indicating that support information of control plane CIoT 5GS optimization needs to be updated. In addition, the 62nd identification information may be updated support information of control plane CIoT 5GS optimization. In addition, the 62nd identification information may be support information of control plane CIoT 5GS optimization that is different from the current support information of control plane CIoT 5GS optimization. In other words, the 62nd identification information may be support information of control plane CIoT 5GS optimization that is different from support information of control plane CIoT 5GS optimization indicated by the previously transmitted and/or received 22nd identification information. Note that the support information of control plane CIoT 5GS optimization may be information indicating that control plane CIoT 5GS optimization is supported, or may be information indicating that control plane CIoT 5GS optimization is not supported.

In addition, the 62nd identification information may be information selected and determined based on one or more pieces of identification information out of the 1st identification information to the 3rd identification information and the 21st identification information to the 23rd identification information previously transmitted and/or received by the network, and/or information associated with the NSI, and/or capability information of the network, and/or an operator policy, and/or a state of the network, and/or registration information of a user, and/or the like. In addition, the 62nd identification information may be information similar to the information indicated by the 22nd identification information.

The 63rd identification information is new support information of user plane CIoT 5GS optimization. The 63rd identification information may be information indicating that support information of user plane CIoT 5GS optimization needs to be updated. In addition, the 63rd identification information may be updated support information of user plane CIoT 5GS optimization. In addition, the 63rd identification information may be support information of user plane CIoT 5GS optimization that is different from the current support information of user plane CIoT 5GS optimization. In other words, the 63rd identification information may be support information of user plane CIoT 5GS optimization that is different from support information of user plane CIoT 5GS optimization indicated by the previously transmitted and/or received 23rd identification information. Note that the support information of user plane CIoT 5GS optimization may be information indicating that user plane CIoT 5GS optimization is supported, or may be information indicating that user plane CIoT 5GS optimization is not supported.

In addition, the 63rd identification information may be information selected and determined based on one or more pieces of identification information out of the 1st identification information to the 3rd identification information and the 21st identification information to the 23rd identification information previously transmitted and/or received by the network, and/or information associated with the NSI, and/or capability information of the network, and/or an operator policy, and/or a state of the network, and/or registration information of a user, and/or the like. In addition, the 63rd identification information may be information similar to the information indicated by the 23rd identification information.

The 64th identification information is new support information of data communication using a communication path of the user plane. The 64th identification information may be information indicating that support information of data communication using a communication path of the user plane needs to be updated. In addition, the 64th identification information may be updated support information of data communication using a communication path of the user plane. In addition, the 64th identification information may be support information of data communication using a communication path of a user plane that is different from support information of data communication using a communication path of the current user plane. In other words, the 64th identification information may be support information of data communication using a communication path of a user plane that is different from support information of data communication using a communication path of a user plane indicated by the previously transmitted and/or received 24th identification information. Note that the support information of data communication using a communication path of the user plane may be information indicating that data communication using a communication path of the user plane is supported, or may be information indicating that data communication using a communication path of the user plane is not supported.

In addition, the 64th identification information may be information selected and determined based on the 4th identification information and/or the 24th identification information previously transmitted and/or received by the network, and/or information associated with the NSI, and/or capability information of the network, and/or an operator policy, and/or a state of the network, and/or registration information of a user, and/or the like. In addition, the 64th identification information may be information similar to the information indicated by the 24th identification information.

The 65th identification information is new support information of Header compression for control plane CIoT 5GS optimization. The 65th identification information may be information indicating that support information of Header compression for control plane CIoT 5GS optimization needs to be updated. In addition, the 65th identification information may be updated support information of Header compression for control plane CIoT 5GS optimization. In addition, the 65th identification information may be support information of Header compression for control plane CIoT 5GS optimization that is different from the current support information of Header compression for control plane CIoT 5GS optimization. In other words, the 65th identification information may be support information of Header compression for control plane CIoT 5GS optimization that is different from support information of Header compression for control plane CIoT 5GS optimization indicated by the previously transmitted and/or received 25th identification information. Note that the support information of Header compression for control plane CIoT 5GS optimization may be information indicating that Header compression for control plane CIoT 5GS optimization is supported, or may be information indicating that Header compression for control plane CIoT 5GS optimization is not supported.

In addition, the 65th identification information may be information selected and determined based on the 5th identification information and/or the 25th identification information previously transmitted and/or received by the network, and/or information associated with the NSI, and/or capability information of the network, and/or an operator policy, and/or a state of the network, and/or registration information of a user, and/or the like. In addition, the 65th identification information may be information similar to the information indicated by the 25th identification information.

The 66th identification information is new restriction information of coverage enhancement. The 66th identification information may be information indicating that restriction information of coverage enhancement needs to be updated. In addition, the 66th identification information may be updated restriction information of coverage enhancement. In addition, the 66th identification information may be restriction information of coverage enhancement that is different from the current restriction information of coverage enhancement. In other words, the 66th identification information may be restriction information of coverage enhancement that is different from restriction information of coverage enhancement indicated by the previously transmitted and/or received 26th identification information. Note that the restriction information of coverage enhancement may be information indicating that use of coverage enhancement is restricted, or may be information indicating that use of coverage enhancement is not restricted.

In addition, the 66th identification information may be information indicating that support information of use restriction of coverage enhancement needs to be updated. The 66th identification information may be updated support information of use restriction of coverage enhancement. In addition, the 66th identification information may be support information of use restriction of coverage enhancement that is different from the current support information of use restriction of coverage enhancement. In other words, the 66th identification information may be support information of use restriction of coverage enhancement that is different from support information of use restriction of coverage enhancement indicated by the previously transmitted and/or received 16th identification information. Note that the support information of use restriction of coverage enhancement may be information indicating that use restriction of coverage enhancement is supported, or may be information indicating that use restriction of coverage enhancement is not supported.

In addition, the 66th identification information may be information selected and determined based on the 6th identification information and/or the 26th identification information previously transmitted and/or received by the network, and/or information associated with the NSI, and/or capability information of the network, and/or an operator policy, and/or a state of the network, and/or registration information of a user, and/or the like. In addition, the 66th identification information may be information similar to the information indicated by the 26th identification information.

The 67th identification information is new support information of 5GMM-CONNECTED mode with RRC inactive indication. The 67th identification information may be information indicating that support information of 5GMM-CONNECTED mode with RRC inactive indication needs to be updated. In addition, the 67th identification information may be updated support information of 5GMM-CONNECTED mode with RRC inactive indication. In addition, the 67th identification information may be support information of 5GMM-CONNECTED mode with RRC inactive indication that is different from the current support information of 5GMM-CONNECTED mode with RRC inactive indication. In other words, the 67th identification information may be support information of 5GMM-CONNECTED mode with RRC inactive indication that is different from support information of 5GMM-CONNECTED mode with RRC inactive indication indicated by the previously transmitted and/or received 27th identification information. Note that the support information of 5GMM-CONNECTED mode with RRC inactive indication may be information indicating that 5GMM-CONNECTED mode with RRC inactive indication is supported, or may be information indicating that 5GMM-CONNECTED mode with RRC inactive indication is not supported.

Note that the 67th identification information may be identification information indicating the same meaning as the 63rd identification information. In addition, in a case that the 63rd identification information and the 67th identification information indicate the same meaning, only one of the 63rd identification information and the 67th identification information may be transmitted and/or received.

In addition, the 67th identification information may be information selected and determined based on the 7th identification information and/or the 27th identification information transmitted and/or received by the network, and/or information associated with the NSI, and/or capability information of the network, and/or an operator policy, and/or a state of the network, and/or registration information of a user, and/or the like. In addition, the 67th identification information may be information similar to the information indicated by the 27th identification information.

The 69th identification information is information indicating whether or not performing of a registration procedure is requested. The 69th identification information may be a RED bit (Registration requested). The RED bit may be a bit indicating that performing of the registration procedure is requested (registration requested), or may be a bit indicating that performing of the registration procedure is not requested (registration not requested). In addition, the RED bit may be a bit constituting a configuration update indication information element (Configuration update indication). In addition, the 69th identification information may be information indicating that the network requires performing of the registration procedure after completion of the present procedure.

In addition, the 69th identification information may be information selected and determined based on one or more pieces of identification information out of the 61st identification information to the 68th identification information by the network, and/or information associated with the NSI, and/or capability information of the network, and/or an operator policy, and/or a state of the network, and/or registration information of a user, and/or the like.

Note that, in a case that the UE receives the 69th identification information together with one or more pieces of identification information out of the 61st identification information to the 68th identification information, the UE may initiate the registration procedure.

The 121st identification information is a value of the back-off timer C. The 121st identification information may be a new value of the back-off timer C.

In addition, the 121st identification information may be information indicating a time period during which the back-off timer C is run. In other words, the 121st identification information may be information indicating a time period during which communication of user data via the control plane is restricted.

In addition, the 121st identification information may be information for commanding start of operation of the back-off timer C, or may be information for commanding continuation of operation of the back-off timer C. In other words, the 121st identification information may be information indicating that restriction of communication of user data via the control plane is started, or may be information indicating that restriction of communication of user data via the control plane continues.

In addition, the 121st identification information may be information for commanding change of the state of the back-off timer C. In other words, the 121st identification information may be information indicating that restriction of communication of user data via the control plane is changed.

In addition, the 121st identification information may be information for commanding stop of operation of the back-off timer C, or may be information commanding start of operation of the back-off timer C. In other words, the 121st identification information may be information indicating that restriction of communication of user data via the control plane is removed, or may be information indicating that restriction of communication of user data via the control plane is started.

In addition, the 121st identification information may be information that is transmitted and/or received in a case that each apparatus supports control plane CIoT 5GS optimization. In other words, the 121st identification information may be information that is transmitted and/or received in a case that each apparatus supports communication of user data via the control plane.

In addition, the 121st identification information may be information that is transmitted and/or received in a case that the UE supports the back-off timer for communication of user data via the control plane. In other words, the 121st identification information may be information that is transmitted and/or received in a case that the UE sends out a notification that the UE supports the back-off timer for communication of user data via the control plane in a procedure such as the registration procedure.

In addition, the 121st identification information may be information selected and determined based on one or more pieces of identification information out of the 1st identification information, the 2nd identification information, the 21st identification information, the 22nd identification information, and the 101st identification information previously transmitted and/or received by the network, and/or information associated with the NSI, and/or capability information of the network, and/or an operator policy, and/or a state of the network, and/or registration information of a user, and/or the like. In addition, the 121st identification information may be information similar to the information indicated by the 111th identification information.

In addition, the 121st identification information may be information that is transmitted and/or received together with information indicating that the 121st identification information is a value of the back-off timer C. In other words, each apparatus may transmit and/or receive the 121st identification information together with information for identifying the 121st identification information.

The 122nd identification information is information indicating a range to which restriction of communication of user data via the control plane is applied. Here, the range to which restriction of communication of user data via the control plane is applied may be all of the PLMNs, or may be only the current PLMN. In addition, the range to which restriction of communication of user data via the control plane is applied may be the current registration area, or may be the current tracking area. In addition, the range to which restriction of communication of user data via the control plane is applied may be an area configured by the network.

In addition, the 122nd identification information may be information indicating a new range to which restriction of communication of user data via the control plane is applied.

In other words, the 122nd identification information may be information indicating that the range to which restriction of communication of user data via the control plane is applied is changed, or may be information indicating a changed range to which restriction of communication of user data via the control plane is applied.

In addition, the 122nd identification information may be information that is transmitted and/or received in a case that each apparatus supports control plane CIoT 5GS optimization. In other words, the 122nd identification information may be information that is transmitted and/or received in a case that each apparatus supports communication of user data via the control plane.

In addition, the 122nd identification information may be information that is transmitted and/or received in a case that the UE supports the back-off timer for communication of user data via the control plane. In other words, the 122nd identification information may be information that is transmitted and/or received in a case that the UE sends out a notification that the UE supports the back-off timer for communication of user data via the control plane in a procedure such as the registration procedure.

In addition, the 122nd identification information may be information that is transmitted and/or received in a case that the 121st identification information is transmitted and/or received. In other words, the 122nd identification information may be information that is transmitted and/or received together with the 121st identification information.

In addition, the 122nd identification information may be information selected and determined based on one or more pieces of identification information out of the 1st identification information, the 2nd identification information, the 21st identification information, the 22nd identification information, and the 101st identification information previously transmitted and/or received by the network, and/or information associated with the NSI, and/or capability information of the network, and/or an operator policy, and/or a state of the network, and/or registration information of a user, and/or the like. In addition, the 122nd identification information may be information similar to the information indicated by the 112th identification information.

3.2. Description of Procedures Used in Each Embodiment

Next, procedures used in each embodiment will be described. Note that the procedures used in each embodiment include a Registration procedure, a PDU session establishment procedure, and a UE configuration update procedure (Generic UE configuration update procedure). Each procedure will be described below.

Note that, in each embodiment, as illustrated in FIG. 2, description will be given by taking an example of a case that the HSS and the UDM, the PCF and the PCRF, the SMF and the PGW-C, and the UPF and the PGW-U are each configured as the same apparatus (that is, the same piece of physical hardware, or the same piece of logical hardware, or the same piece of software). However, the details described in the present embodiment can also be applied to a case that these are configured as different apparatuses (that is, different pieces of physical hardware, or different pieces of logical hardware, or different pieces of software). For example, transmission and/or reception of data may be directly performed among these, data may be transmitted and/or received via the N26 interface between the AMF and the MME, or data may be transmitted and/or received via the UE.

3.2.1. Registration Procedure

First, the Registration procedure will be described with reference to FIG. 6. The registration procedure is a procedure in the SGS. The present procedure hereinafter refers to the registration procedure. The registration procedure is a procedure for registration with the access networkB, and/or the core networkB, and/or the DN as initiated by the UE. On the condition that the UE is a state of not being registered with the network, for example, the UE can perform the present procedure at any timing such as the timing at which the UE is turned on. In other words, the UE can initiate the present procedure at any timing on the condition that the UE is in the deregistered state (RM-DEREGISTERED state). Each apparatus (in particular, the UE and the AMF) can transition to the registered state (RM-REGISTERED state), based on completion of the registration procedure.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility across the TA, the UE may initiate the registration procedure. In other words, in a case that the UE moves to a TA that is different from the TA indicated in the stored TA list, the UE may initiate the registration procedure. In addition, the UE may initiate the present procedure in a case that an operating timer expires. In addition, the UE may initiate the registration procedure in a case that a context of each apparatus needs to be updated due to disconnection and deactivation of a PDU session. In addition, in a case that there is a change in capability information and/or a preference related to PDU session establishment of the UE, the UE may initiate the registration procedure. In addition, the UE may periodically initiate the registration procedure. In addition, the UE may initiate the registration procedure, based on completion of the UE configuration update procedure, or based on information received from the network in each procedure. Note that these are not restrictive, and the UE can perform the registration procedure at any timing.

First, the UE transmits a Registration request message to the AMF via the 5G AN (or the gNB) (S800) (S802) (S804), and thereby initiates the registration procedure. Specifically, the UE transmits an RRC message including the registration request message to the 5G AN (or the gNB) (S800). Note that the registration request message is a NAS message. The RRC message may be a control message transmitted and/or received between the UE and the 5G AN (or the gNB). The NAS message is processed in the NAS layer, and the RRC message is processed in the RRC layer. Note that the NAS layer is a layer higher than the RRC layer.

Here, the UE can transmit at least one or more pieces of identification information out of the 1st identification information to the 8th identification information on the registration request message and/or the RRC message; however, the UE may transmit the one or more pieces of identification information on a control message different from the above, e.g., a control message of a layer (for example, the MAC layer, the RLC layer, or the PDCP layer) lower than the RRC layer. Note that, by transmitting these pieces of identification information, the UE may indicate that the UE supports each function, or may indicate a request of the UE. In addition, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting the 1st identification information and/or the 2nd identification information, the UE may indicate a request for use of control plane CIoT 5GS optimization. In this case, the 1st identification information may be information indicating control plane CIoT 5GS optimization. In addition, the 2nd identification information may be information indicating support of control plane CIoT 5GS optimization.

In addition, by transmitting the 1st identification information, and/or the 3rd identification information, and/or the 4th identification information, the UE may indicate a request for use of user plane CIoT 5GS optimization. In this case, the 1st identification information may be information indicating user plane CIoT 5GS optimization. In addition, the 3rd identification information may be information indicating support of user plane CIoT 5GS optimization. In addition, the 4th identification information may be information indicating support of data communication using a communication path of the user plane.

In addition, by transmitting the 5th identification information, the UE may indicate a request for use of Header compression for control plane CIoT 5GS optimization. In this case, the 5th identification information may be information indicating support of Header compression for control plane CIoT 5GS optimization.

In addition, by transmitting the 6th identification information, the UE may indicate a request for use of use restriction of coverage enhancement. In this case, the 6th identification information may be information indicating support of use restriction of coverage enhancement.

In addition, by transmitting the 7th identification information, the UE may indicate a request for use of 5GMM-CONNECTED mode with RRC inactive indication. In this case, the 7th identification information may be information indicating support of 5GMM-CONNECTED mode with RRC inactive indication.

In addition, by transmitting the 8th identification information, the UE may request use of the NSSAI indicated by the 8th identification information and/or the S-NSSAI included in the 8th identification information, or may indicate the NSSAI whose use is requested.

In addition, by transmitting the 101st identification information, the UE may indicate that the UE supports the back-off timer for communication of user data via the control plane. In this case, the 101st identification information may be information indicating support of the back-off timer for communication of user data via the control plane.

In addition, in a case that the UE supports the back-off timer for communication of user data via the control plane, the UE may configure a bit indicating that the UE supports the back-off timer for communication of user data via the control plane for the 101st identification information, or may include the 101st identification information in the registration request message. In other words, in a case that the UE supports the back-off timer for communication of user data via the control plane, the UE may configure information indicating that the UE supports the back-off timer for communication of user data via the control plane for the CP backoff bit in the 5GMM capability information element that is included in the registration request message.

By transmitting an SM message (for example, the PDU session establishment request message) on the registration request message, or by transmitting an SM message (for example, the PDU session establishment request message) together with the registration request message, the UE may initiate the PDU session establishment procedure during the registration procedure.

After the 5G AN (or the gNB) receives the RRC message including the registration request message, the 5G AN (or the gNB) selects the AMF to which the registration request message is to be transferred (S802). Note that the 5G AN (or the gNB) can select the AMF, based on information included in the registration request message and/or the RRC message. The 5G AN (or the gNB) extracts the registration request message from the received RRC message, and transfers the registration request message to the selected AMF (S804).

In a case that the AMF receives the registration request message, the AMF can perform the 1st condition determination. The 1st condition determination is a condition determination for determining whether or not the network (or the AMF) accepts the request from the UE. In a case that the 1st condition determination is true, the AMF initiates the procedure of (A) of FIG. 6, whereas in a case that the 1st condition determination is false, the AMF initiates the procedure of (B) of FIG. 6.

Note that the 1st condition determination may be performed based on reception of the registration request message, and/or each piece of identification information included in the registration request message, and/or subscriber information, and/or capability information of the network, and/or an operator policy, and/or a state of the network, and/or registration information of a user, and/or a context stored in the AMF, and/or the like. For example, in a case that the network allows the request from the UE, the 1st condition determination may be true, whereas in a case that the network does not allow the request from the UE, the 1st condition determination may be false. In a case that a destination network with which the UE is to be registered and/or an apparatus in the network supports the function requested by the UE, the 1st condition determination may be true, whereas in a case that the destination network and/or the apparatus does not support the function requested by the UE, the 1st condition determination may be false. In addition, in a case that the transmitted and/or received identification information is allowed, the 1st condition determination may be true, whereas in a case that the transmitted and/or received identification information is not allowed, the 1st condition determination may be false. Note that the conditions on which true or false of the 1st condition determination is determined need not be limited to the conditions described above.

First, a case that the 1st condition determination is true will be described. In the procedure of (A) of FIG. 6, first, the AMF can perform the 4th condition determination. The 4th condition determination is a condition determination for determining whether or not the AMF performs transmission and/or reception of an SM message to and/or from the SMF.

Note that the 4th condition determination may be performed based on whether or not the AMF has received an SM message. The 4th condition determination may be performed based on whether the registration request message includes an SM message. For example, in a case that the AMF receives an SM message, and/or a case that the registration request message includes an SM message, the 4th condition determination may be true, whereas in a case that the AMF does not receive an SM message, and/or a case that the registration request message does not include an SM message, the 4th condition determination may be false. Note that the conditions on which true or false of the 4th condition determination is determined need not be limited to the conditions described above.

In a case that the 4th condition determination is true, the AMF selects the SMF, and performs transmission and/or reception of an SM message to and/or from the selected SMF, whereas in a case that the 4th condition determination is false, the AMF does not perform the transmission and/or reception (S806). Even in a case that the 4th condition determination is true, the AMF may cancel the procedure of (A) of FIG. 6, on the condition that the AMF receives an SM message indicating rejection from the SMF. In this case, the AMF can initiate the procedure of (B) of FIG. 6.

Note that, in a case that the AMF performs transmission and/or reception of an SM message to and/or from the SMF in S806, the AMF can notify the SMF of the identification information received in the registration request message. The SMF transmits and/or receives an SM message to and/or from the AMF, and can thereby acquire the identification information received from the AMF.

Next, the AMF transmits a Registration accept message to the UE via the 5G AN (or the gNB) as a response message to the registration request message, based on reception of the registration request message, and/or completion of transmission and/or reception of the SM message to and/or from the SMF (S808). For example, in a case that the 4th condition determination is true, the AMF may transmit the registration accept message, based on reception of the registration request message from the UE. In a case that the 4th condition determination is false, the AMF may transmit the registration accept message, based on completion of transmission and/or reception of the SM message to and/or from the SMF. Note that the registration accept message is a NAS message transmitted and/or received on the N1 interface; however, between the UE and the 5G AN (gNB), the registration accept message is transmitted and/or received on an RRC message.

The AMF may transmit at least one or more pieces of identification information out of the 21st identification information to the 28th identification information, the 111th identification information, and the 112th identification information included in the registration accept message. Note that, by transmitting these pieces of identification information, the AMF may indicate that the network supports each function, or may indicate that the request from the UE is accepted. In addition, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting the 21st identification information and/or the 22nd identification information, the AMF may indicate acceptance of use of control plane CIoT 5GS optimization. In this case, the 21st identification information may be information indicating control plane CIoT 5GS optimization. In addition, the 22nd identification information may be information indicating support of control plane CIoT 5GS optimization.

In addition, by transmitting the 21st identification information, and/or the 23rd identification information, and/or the 24th identification information, the AMF may indicate acceptance of use of user plane CIoT 5GS optimization. In this case, the 21st identification information may be information indicating user plane CIoT 5GS optimization. In addition, the 23rd identification information may be information indicating support of user plane CIoT 5GS optimization. In addition, the 24th identification information may be information indicating support of data communication using a communication path of the user plane.

In addition, by transmitting the 25th identification information, the AMF may indicate acceptance of use of Header compression for control plane CIoT 5GS optimization. In this case, the 25th identification information may be information indicating support of Header compression for control plane CIoT 5GS optimization.

In addition, by transmitting the 26th identification information, the AMF may indicate restriction of use of coverage enhancement. In this case, the 26th identification information may be information indicating that use of coverage enhancement is restricted.

In addition, by transmitting the 27th identification information, the AMF may indicate acceptance of use of 5GMM-CONNECTED mode with RRC inactive indication. In this case, the 27th identification information may be information indicating support of 5GMM-CONNECTED mode with RRC inactive indication.

In addition, by transmitting the 28th identification information, the UE may indicate that the request for use of the NSSAI indicated by the received 8th identification information and/or the S-NSSAI included in the 8th identification information is accepted, or may notify the UE of the NSSAI for which request for use is accepted.

In addition, by transmitting the 111th identification information, the AMF may notify the UE of a value of the back-off timer C. In addition, by transmitting the 111th identification information, the AMF may command the UE to configure the value indicated by the 111th identification information for the back-off timer C, or may command the UE to start the back-off timer C configured with the value indicated by the 111th identification information. Here, in a case that the back-off timer C operates in the UE, the AMF may command the UE to stop the back-off timer C, and then start the back-off timer C configured with the value indicated by the 111th identification information.

Conversely, in a state in which the back-off timer C operates in the UE, the AMF may command the UE to stop the operating back-off timer C by not transmitting the 111th identification information. More specifically, in a case that the UE initiates the present procedure in the idle mode, the AMF may command the UE to stop the operating back-off timer C by not transmitting the 111th identification information. In other words, in order to command the UE to stop the operating back-off timer C, the AMF may transmit the registration accept message not including the 111th identification information to the UE.

Note that, in a case that the UE uses control plane CIoT 5GS optimization and/or a case that the UE supports control plane CIoT 5GS optimization, the AMF may include the 111th identification information in the registration accept message.

In addition, by transmitting the 111th identification information and/or the 112th identification information, the AMF may notify the UE of a range to which restriction of communication of user data via the control plane is applied. In other words, by transmitting the 111th identification information and/or the 112th identification information, the AMF may indicate a range in which the back-off timer C configured with the 111th identification information is effective, or may indicate a range in which congestion control using the back-off timer C configured with the 111th identification information operating in the UE is effective.

Note that, in a case that the AMF uses control plane CIoT 5GS optimization and/or supports control plane CIoT 5GS optimization, the AMF may include the 111th identification information and/or the 112th identification information in the registration accept message.

In addition, in a case that the UE sends out a notification that the UE supports the back-off timer for communication of user data via the control plane and the AMF determines activation of congestion control for communication of user data via the control plane, the AMF may include the 111th identification information and/or the 112th identification information in the registration accept message. In other words, in a case that the AMF receives the 101st identification information from the UE and activates congestion control using the back-off timer C, the AMF may include the 111th identification information and/or the 112th identification information in the registration accept message. In this case, the 101st identification information may be information indicating support of the back-off timer for communication of user data via the control plane.

In addition, in a case that the AMF includes the 111th identification information and/or the 112th identification information in the registration accept message, the AMF may store time in which the back-off timer C is operated for each UE. In addition, in a case that the AMF includes the 111th identification information and/or the 112th identification information in the registration accept message, the AMF may store the effective range of the back-off timer C for each UE.

In contrast, in a case that the AMF determines activation of congestion control for communication of user data via the control plane, the AMF need not include the 111th identification information and/or the 112th identification information in the registration accept message. In other words, in a case that the AMF deactivates congestion control using the back-off timer C, the AMF need not include the 111th identification information and/or the 112th identification information in the registration accept message.

In addition, in a case that the AMF does not include the 121st identification information and/or the 122nd identification information in the registration accept message, the AMF may release the time in which the back-off timer C is operated that is stored for each UE. In addition, in a case that the AMF includes the 121st identification information and/or the 122nd identification information in the registration accept message, the AMF may release the effective range of the back-off timer C stored for each UE.

Note that the AMF may select and determine which piece of identification information out of the 21st identification information to the 28th identification information, the 111th identification information, and the 112th identification information is to be included in the registration accept message, based on each piece of received identification information, and/or subscriber information, and/or capability information of the network, and/or an operator policy, and/or a state of the network, and/or registration information of a user, and/or a context stored in the AMF, and/or the like.

The AMF can either transmit an SM message (for example, the PDU session establishment accept message) on the registration accept message, or transmit an SM message (for example, the PDU session establishment accept message) together with the registration accept message. Note that the transmission method may be performed in a case that the SM message (for example, the PDU session establishment request message) is included in the registration request message and the 4th condition determination is true. The transmission method may be performed in a case that the SM message (for example, the PDU session establishment request message) is included together with the registration request message and the 4th condition determination is true. By performing the transmission method as described above, the AMF can indicate that a procedure for SM is accepted in the registration procedure.

By transmitting the registration accept message based on each piece of received identification information, and/or subscriber information, and/or capability information of the network, and/or an operator policy, and/or a state of the network, and/or registration information of a user, and/or a context stored in the AMF, and/or the like, the AMF may indicate that the request from the UE is accepted.

In addition, the AMF may transmit information indicating that a part of the request from the UE is rejected on the registration accept message, or may transmit information indicating that a part of the request from the UE is rejected so as to indicate a reason of rejection of the part of the request from the UE. In addition, by receiving the information indicating that the part of the request of the UE is rejected, the UE may recognize the reason of rejection of the part of the request from the UE. Note that the reason for rejection may be information indicating that details indicated by the identification information received by the AMF are not allowed.

The UE receives the registration accept message via the 5G AN (gNB) (S808). By receiving the registration accept message, the UE can recognize that the request from the UE on the registration request message is accepted, and recognize details of various pieces of identification information included in the registration accept message.

The UE can further transmit a registration complete message to the AMF via the 5G AN (gNB) as a response message to the registration accept message (S810). Note that, in a case that the UE receives the SM message such as the PDU session establishment accept message, the UE may transmit the SM message such as the PDU session establishment complete message on the registration complete message, or may indicate that the procedure for SM has completed by including the SM message. Here, the registration complete message is a NAS message transmitted and/or received on the N1 interface; however, between the UE and the 5G AN (gNB), the registration complete message is transmitted and/or received on an RRC message.

The AMF receives the registration complete message via the 5G AN (gNB) (S810). Each apparatus completes the procedure of (A) of FIG. 6, based on transmission and/or reception of the registration accept message and/or the registration complete message.

Next, a case that the 1st condition determination is false will be described. In the procedure of (B) of FIG. 6, the AMF transmits a Registration reject message to the UE via the 5G AN (gNB) as a response message to the registration request message (S812). Here, the registration reject message is a NAS message transmitted and/or received on the N1 interface; however, between the UE and the 5G AN (gNB), the registration reject message is transmitted and/or received on an RRC message.

Note that, by transmitting the registration reject message, the AMF may indicate that the request from the UE on the registration request message is rejected. In addition, the AMF may transmit information indicating a reason of rejection on the registration reject message, or may indicate a reason of rejection by transmitting the reason of rejection. In addition, by receiving the information indicating the reason of rejection of the request from the UE, the UE may recognize the reason of rejection of the request from the UE. Note that the reason for rejection may be information indicating that details indicated by the identification information received by the AMF are not allowed.

The UE may delete stored information, based on the registration reject message. In addition, the UE may start counting of the back-off timer, based on reception of the registration reject message. Here, the back-off timer started by the UE may use a back-off timer value received from the network, or may use a timer value stored in the UE. While the UE performs at least counting of the back-off timer, the UE need not initiate the registration procedure again, may stop the registration procedure, or may be prohibited from performing the registration procedure. In addition, the UE may transition to a state in which a service is restricted, based on reception of the registration reject message. Here, the back-off timer may be the back-off timer C, or may be a timer other than the back-off timer C.

Note that each type of processing performed by the UE based on reception of each piece of identification information described above may be performed during the present procedure or after completion of the present procedure, or may be performed based on completion of the present procedure after completion of the present procedure.

The UE receives the registration reject message via the 5G AN (gNB) (S812). By receiving the registration reject message, the UE can recognize that the request from the UE on the registration request message is rejected, and recognize details of various pieces of identification information included in the registration reject message. In a case that the UE does not receive the registration accept message or the registration reject message even after a prescribed time period has elapsed after transmitting the registration request message, the UE may recognize that the request from the UE is rejected. Each apparatus completes the procedure of (B) in the present procedure, based on transmission and/or reception of the registration reject message.

Figure 6:
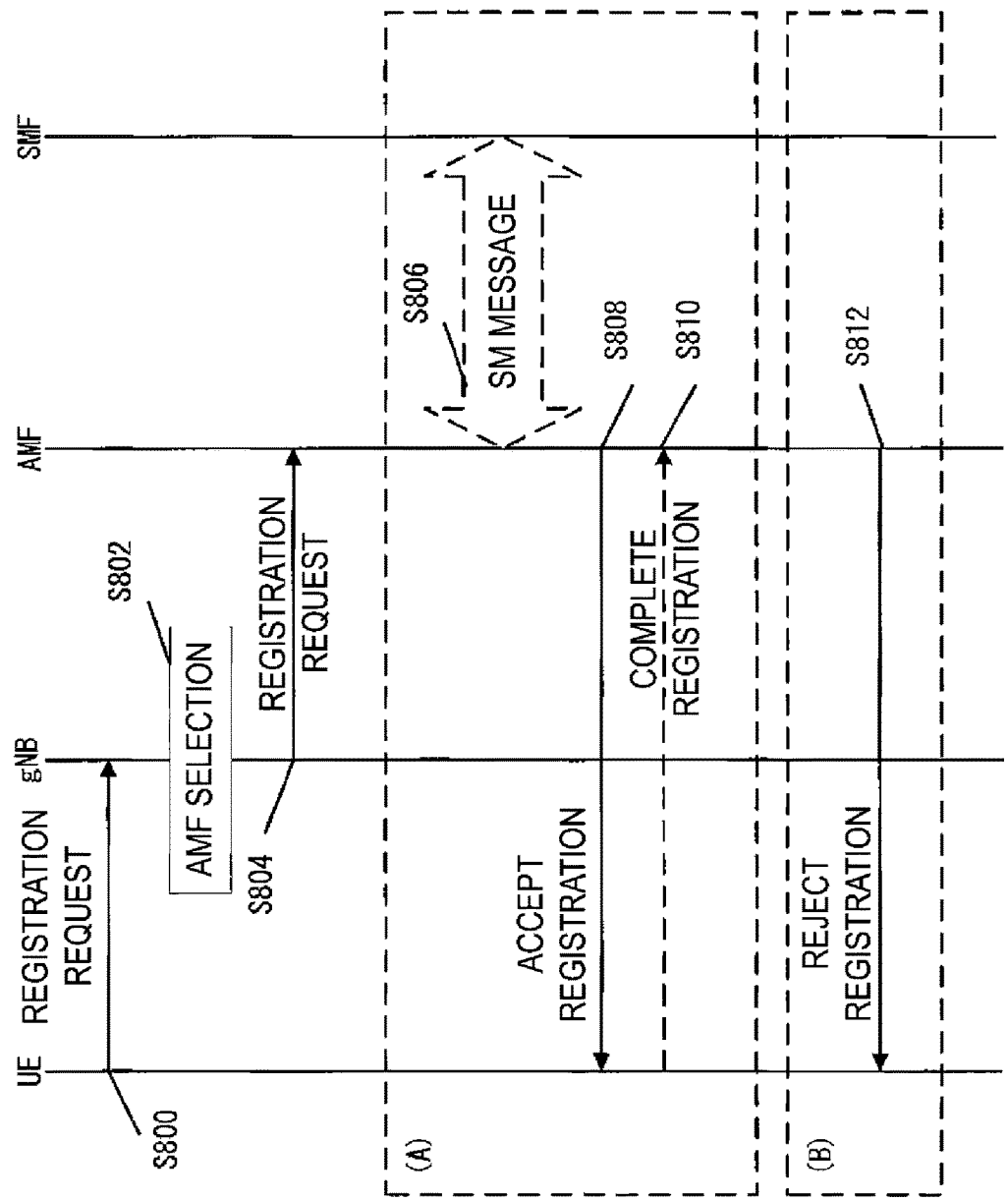
FIG. 6 is a diagram illustrating a registration procedure.

Note that the procedure of (B) of FIG. 6 may be initiated in a case that the procedure of (A) of FIG. 6 is cancelled. In the procedure of (A) of FIG. 6, in a case that the 4th condition determination is true, the AMF may transmit an SM message indicating rejection, such as a PDU session establishment reject message, on the registration reject message, or may indicate that the procedure for SM is rejected by including an SM message indicating rejection. In that case, further, the UE may receive the SM message indicating rejection, such as the PDU session establishment reject message, or may recognize that the procedure for SM is rejected.

Each apparatus completes the registration procedure, based on completion of the procedure of (A) or (B) of FIG. 6. Note that each apparatus may transition to a state (RM-REGISTERED state) in which the UE is registered with the network, based on completion of the procedure of (A) of FIG. 6, may maintain a state (RM DEREGISTERED state) in which the UE is not registered with the network or may transition to a state in which the UE is not registered with the network, based on completion of the procedure of (B) of FIG. 6. Transition of each apparatus to each state may be performed based on completion of the registration procedure, or may be performed based on establishment of a PDU session.

In addition, each apparatus may perform processing based on information transmitted and/or received in the registration procedure, based on completion of the registration procedure.

For example, in a case that information indicating that a part of the request from the UE is rejected is transmitted and/or received, a reason of rejection of the request from the UE may be recognized. In addition, based on the reason of rejection of the request from the UE, each apparatus may perform the present procedure again, or may perform the registration procedure with respect to another core network or another cell.

In addition, based on completion of the registration procedure, the UE may store identification information received together with the registration accept message and/or the registration reject message, or may recognize determination of the network.

For example, in a case that the UE receives the 21st identification information and/or the 22nd identification information, the UE may recognize that use of control plane CIoT 5GS optimization is accepted. In this case, the 21st identification information may be information indicating control plane CIoT 5GS optimization. In addition, the 22nd identification information may be information indicating support of control plane CIoT 5GS optimization.

In addition, in a case that the UE receives the 21st identification information, and/or the 23rd identification information, and/or the 24th identification information, the UE may recognize that use of user plane CIoT 5GS optimization is accepted. In this case, the 21st identification information may be information indicating user plane CIoT 5GS optimization. In addition, the 23rd identification information may be information indicating support of user plane CIoT 5GS optimization. In addition, the 24th identification information may be information indicating support of data communication using a communication path of the user plane.

In addition, in a case that the UE receives the 25th identification information, the UE may recognize that use of Header compression for control plane CIoT 5GS optimization is accepted. In this case, the 25th identification information may be information indicating support of Header compression for control plane CIoT 5GS optimization.

In addition, in a case that the UE receives the 26th identification information, the UE may recognize that use of coverage enhancement is restricted. In this case, the 26th identification information may be information indicating that use of coverage enhancement is restricted.

In addition, in a case that the UE receives the 27th identification information, the UE may recognize that use of 5GMM-CONNECTED mode with RRC inactive indication is accepted. In this case, the 27th identification information may be information indicating support of 5GMM-CONNECTED mode with RRC inactive indication.

In addition, in a case that the UE receives the 28th identification information, the UE may recognize that the request for use of the NSSAI indicated by the 8th identification information and/or the S-NSSAI included in the 8th identification information transmitted on the registration request message is accepted. In addition, in a case that the UE receives the 28th identification information, the UE may recognize the NSSAI and/or the S-NSSAI for which request for use is accepted, or may store the NSSAI and/or the S-NSSAI in a context.

In addition, in a case that the UE receives the 111th identification information, the UE may recognize a value indicated by the 111th identification information as a value of the back-off timer C.

In addition, in a case that the UE receives the 111th identification information, the UE may configure the value indicated by the 111th identification information for the back-off timer C, or may start the back-off timer C configured with the value indicated by the 111th identification information. Here, in a case that the back-off timer C operates, the UE may stop the back-off timer C, and then start the back-off timer C configured with the value indicated by the 111th identification information.

In contrast, in a case that the UE does not receive the 111th identification information in a state in which the back-off timer C is running, the UE may stop the operating back-off timer C. More specifically, in a case that the UE initiates the present procedure in the idle mode and does not receive the 111th identification information, the UE may stop the operating back-off timer C.

Note that, in a case that the UE uses control plane CIoT 5GS optimization, the UE may perform the above-described processing of a case that the UE receives the 111th identification information. In contrast, in a case that the UE does not use control plane CIoT 5GS optimization, the UE may ignore the received 111th identification information.

In addition, in a case that the UE receives the 111th identification information and/or the 112th identification information, the UE may recognize a range to which restriction of communication of user data via the control plane is applied. In other words, in a case that the UE receives the 111th identification information and/or the 112th identification information, the UE may recognize a range in which the back-off timer C configured with the 111th identification information is effective, or may recognize a range in which congestion control using the back-off timer C configured with the 111th identification information is effective.

Note that, in a case that the UE uses control plane CIoT 5GS optimization, the UE may perform the above-described processing of a case that the UE receives the 111th identification information and/or the 112th identification information. In contrast, in a case that the UE does not use control plane CIoT 5GS optimization, the UE may ignore the received 111th identification information and/or 112th identification information.

3.2.2. PDU Session Establishment Procedure

Next, an overview of the PDU session establishment procedure performed for establishing a PDU session with respect to the DN will be described with reference to FIG. 7. The PDU session establishment procedure is a procedure in the 5GS. The present procedure hereinafter refers to the PDU session establishment procedure. The PDU session establishment procedure is a procedure for each apparatus to establish a PDU session. Note that each apparatus can initiate the PDU session establishment procedure at any timing after the registration procedure has completed and the state enters the registered state. Each apparatus may be able to perform the PDU session establishment procedure during the registration procedure. Each apparatus may establish a PDU session, based on completion of the PDU session establishment procedure. Note that the PDU session establishment procedure may be a procedure initiated by the UE, or may be a procedure initiated in response to a request from the UE. Each apparatus can establish multiple PDU sessions by performing the PDU session establishment procedure multiple times.

In addition, the UE may initiate the PDU session establishment procedure, based on the identification information received in the registration procedure. For example, in a case that the UE can use control plane CIoT 5GS optimization, the UE may initiate the PDU session establishment procedure in order to establish a PDU session in which control plane CIoT 5GS optimization can be used.

In addition, in a case that the UE can use user plane CIoT 5GS optimization, the UE may initiate the PDU session establishment procedure in order to establish a PDU session in which user plane CIoT 5GS optimization can be used.

In addition, in a case that the UE can use control plane CIoT 5GS optimization, and can further use user plane CIoT 5GS optimization and/or data communication using a communication path of the user plane, the UE may initiate the PDU session establishment procedure in order to establish a PDU session in which a procedure for establishing a user plane radio bearer can be performed. Note that the procedure for establishing a user plane radio bearer may be the service request procedure. Note that the procedure for establishing a user plane radio bearer may be the service request procedure.

In addition, in a case that the UE can use control plane CIoT 5GS optimization and/or Header compression for control plane CIoT 5GS optimization, the UE may initiate the PDU session establishment procedure in order to establish a PDU session in which the header compression function can be used.

In addition, in a case that the UE is located in an area in which connection to an LADN is possible and/or a case that the UE is located in an LADN service area, the UE may initiate the PDU session establishment procedure in order to establish a PDU session for the LADN. In other words, in a case that the UE is located outside the LADN service area, the UE may be prohibited from performing the PDU session establishment procedure for establishing a PDU session for the LADN.

In addition, in a case that the back-off timer does not operate, the UE may initiate the PDU session establishment procedure. In other words, in a case that the back-off timer is started, the UE may be prohibited from performing the PDU session establishment procedure.

First, the UE transmits a NAS message including a PDU session establishment request message to the SMF via the 5G AN (gNB) and the AMF (S900) (S902) (S904), and thereby initiates the PDU session establishment procedure.

Specifically, the UE transmits a NAS message including a PDU session establishment request message to the AMF via the 5G AN (gNB) via the N1 interface (S900).

Here, the UE can transmit at least one or more pieces of identification information out of the 41st identification information to the 44th identification information on the PDU session establishment request message and/or the NAS message; however, the UE may transmit the one or more pieces of identification information on a control message different from the above, e.g., a control message of a layer (for example, the MAC layer, the RLC layer, or the PDCP layer) lower than the RRC layer. Being included in these messages, these pieces of identification information may indicate a request from the UE. Two or more pieces of identification information of these pieces of identification information may be configured as one or more pieces of identification information.

The UE can include a DNN corresponding to the DN to which the UE requests to be connected in the PDU session establishment request message. Note that, in a case that the UE requests establishment of a PDU session in which CIoT 5GS optimization can be used, the UE may select a DNN in which CIoT 5GS optimization is supported and/or a DNN in which use of the function is accepted, and include the selected DNN in the PDU session establishment request message.

In a case that the UE requests establishment of a PDU session for the LADN, the UE may select the LADN DNN as a DNN, and include the selected DNN in the PDU session establishment request message. In this case, the UE may select the DNN out of stored LADN information. Note that the stored LADN information may be information received from the network in the registration procedure and/or the UE configuration update procedure, or may be information configured for the UE in advance.

The UE can generate a PDU session ID, and include the generated PDU session ID in the PDU session establishment request message. The UE can include a request type indicating the purpose of establishing a PDU session in the PDU session establishment request message. The request type includes an initial request, an existing PDU session, and an initial emergency request. The initial request is specified in a case that establishment of a new PDU session for non-emergency is requested. The existing PDU session is specified in a case that handover of a PDU session for non-emergency between 3GPP access and non-3GPP access and transfer of PDN connection from the EPS to the 5GS are performed. The initial emergency request is specified in a case that establishment of a new PDU session for emergency is requested.

The UE can specify a PDU session type indicating a type of PDU session whose establishment is requested. As the PDU session type, as described above, one of IPv4, IPv6, IP, Ethernet, and Unstructured can be specified. The UE can include the SSC mode of the PDU session whose establishment is requested in the PDU session establishment request message.

In addition, in a case that the UE supports control plane CIoT 5GS optimization and/or Header compression for control plane CIoT 5GS optimization, the UE may include configuration information (Header compression configuration IE) of the header compression function in the PDU session establishment request message. More specifically, in a case that the PDU session type is one of IPv4, IPv6, and IP and the UE supports control plane CIoT 5GS optimization and/or Header compression for control plane CIoT 5GS optimization, the UE may include configuration information of the header compression function in the PDU session establishment request message.

In other words, in a case that the PDU session type is configured to be one of IPv4, IPv6, and IP, and the UE indicates support of control plane CIoT 5GS optimization and/or Header compression for control plane CIoT 5GS optimization by using the registration request message, the UE may include configuration information of the header compression function in the PDU session establishment request message.

In addition, in a case that the UE supports control plane CIoT 5GS optimization and/or Header compression for control plane CIoT 5GS optimization, the UE may further include configuration information (Header compression configuration IE) of the header compression function in the PDU session establishment request message. More specifically, in a case that the PDU session type is one of IPv4, IPv6, and IP, and the UE further supports control plane CIoT 5GS optimization and/or Header compression for control plane CIoT 5GS optimization, the UE may include configuration information of the header compression function as well as the 42nd identification information in the PDU session establishment request message.

In other words, in a case that the PDU session type is configured to be one of IPv4, IPv6, and IP, and the UE further indicates support of control plane CIoT 5GS optimization and/or Header compression for control plane CIoT 5GS optimization by the UE by using the registration request message, the UE may further include configuration information of the header compression function in the PDU session establishment request message.

In contrast, in a case that the PDU session type is none of IPv4, IPv6, and IP, or the UE does not support control plane CIoT 5GS optimization and/or Header compression for control plane CIoT 5GS optimization, the UE need not include configuration information of the header compression function in the PDU session establishment request message.

In addition, by transmitting the 43rd identification information, the UE may request establishment of a PDU session of an SSC mode indicated by the 43rd identification information, or may request an SSC mode associated with a PDU session to be established. Note that the information SSC mode indicated by the 43rd identification information may be one of "SSC mode 1", "SSC mode 2", and "SSC mode 3".

In addition, in a case that the UE can use control plane CIoT 5GS optimization, the UE may transmit the 43rd identification information used for configuration of SSC mode 1. In addition, even in a case that the UE can use control plane CIoT 5GS optimization, the UE may transmit the 43rd identification information used for configuration of SSC mode 2 or SSC mode 3. In addition, in a case that the UE can use control plane CIoT 5GS optimization, the UE may omit transmission of the 43rd identification information.

After the AMF receives the NAS message including the PDU session establishment request message (S900), the AMF extracts the PDU session establishment request message from the NAS message, and selects an SMF as a transfer destination of the PDU session establishment request message (S902). Note that the AMF may select the SMF as a transfer destination, based on each piece of identification information included in the PDU session establishment request message and/or the NAS message, and/or subscriber information, and/or capability information of the network, and/or an operator policy, and/or a state of the network, and/or registration information of a user, and/or a context stored in the AMF, and/or the like.

The AMF transfers the PDU session establishment request message to the selected SMF via the N11 interface (S904).

After the SMF receives the PDU session establishment request message (S904), the SMF recognizes various pieces of identification information included in the PDU session establishment request message. Then, the SMF performs the 3rd condition determination. The 3rd condition determination is a condition determination for determining whether or not the SMF accepts the request from the UE. In the 3rd condition determination, the SMF determines whether the 3rd condition determination is true or false. In a case that the 3rd condition determination is true, the SMF initiates the procedure of (A) of FIG. 7, whereas in a case that the 3rd condition determination is false, the SMF initiates the procedure of (B) of FIG. 7.

Note that the 3rd condition determination may be performed based on each piece of identification information included in the PDU session establishment request message and/or the PDU session establishment request message, and/or subscriber information, and/or capability information of the network, and/or an operator policy, and/or a state of the network, and/or registration information of a user, and/or a context stored in the SMF, and/or the like. For example, in a case that the network allows the request from the UE, the 3rd condition determination may be true. In a case that the network does not allow the request from the UE, the 3rd condition determination may be false. In addition, in a case that a destination network to which the UE is to be connected and/or an apparatus in the network supports the function requested by the UE, the 3rd condition determination may be true, whereas in a case that the destination network and/or the apparatus does not support the function requested by the UE, the 3rd condition determination may be false. In addition, in a case that the transmitted and/or received identification information is allowed, the 3rd condition determination may be true, whereas in a case that the transmitted and/or received identification information is not allowed, the 3rd condition determination may be false. Note that the conditions on which true or false of the 3rd condition determination is determined need not be limited to the conditions described above.

Next, steps of a case that the 3rd condition determination is true, that is, steps of the procedure of (A) of FIG. 7, will be described. The SMF selects destination UPF(s) with which a PDU session is to be established and transmits a session establishment request message to the selected UPF (s) via the N4 interface (S906), and thereby initiates the procedure of (A) of FIG. 7.

Here, the SMF may select one or more UPFs, based on each piece of identification information acquired based on reception of the PDU session establishment request message, and/or subscriber information, and/or capability information of the network, and/or an operator policy, and/or a state of the network, and/or registration information of a user, and/or a context stored in the SMF, and/or the like. Note that, in a case that multiple UPFs are selected, the SMF may transmit the session establishment request message to each of the UPFs.

The UPF receives the session establishment request message from the SMF via the N4 interface (S906), and creates a context for the PDU session. In addition, the UPF transmits a session establishment response message to the SMF via the N4 interface, based on reception of the session establishment request message and/or creation of the context for the PDU session (S908).

The SMF receives the session establishment response message from the UPF via the N4 interface as a response message to the session establishment request message (S908). The SMF may perform address allocation for an address to be allocated to the UE, based on reception of the PDU session establishment request message and/or selection of the UPF, and/or reception of the session establishment response message.

The SMF transmits a PDU session establishment accept message to the UE via the AMF, based on reception of the PDU session establishment request message, and/or selection of the UPF, and/or reception of the session establishment response message, and/or completion of address allocation of an address to be allocated to the UE (S910) (S912).

Specifically, after the SMF transmits the PDU session establishment accept message to the AMF via the N11 interface (S910), the AMF that has received the PDU session establishment request message transmits a NAS message including the PDU session establishment accept message to the UE via the N1 interface (S912). Note that the PDU session establishment accept message may be a NAS message, and may be a response message to the PDU session establishment request. The PDU session establishment accept message can indicate that establishment of a PDU session is accepted.

Here, by transmitting the PDU session establishment accept message, the SMF and the AMF may indicate that the request from the UE represented by the PDU session establishment request is accepted.

The SMF and the AMF may transmit at least one or more pieces of identification information out of the 51st identification information to the 53rd identification information on the PDU session establishment accept message. Note that, by transmitting these pieces of identification information, the SMF and the AMF may indicate that the network supports each function, or may indicate that the request from the UE is accepted. In addition, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting the 51st identification information, the SMF and the AMF may indicate acceptance of establishment of a PDU session in which only control plane CIoT 5GS optimization can be used. By transmitting the 52nd identification information, the SMF and the AMF may indicate acceptance of establishment of a PDU session associated with an S-NSSAI.

Here, the SMF and the AMF may select an appropriate S-NSSAI out of S-NSSAIs indicated by the received 42nd identification information or stored S-NSSAIs, and may configure the selected appropriate S-NSSAI for the 52nd identification information. Specifically, in a case that the SMF and the AMF accept establishment of a PDU session in which CIoT 5GS optimization can be used, the SMF and the AMF may select an S-NSSAI in which CIoT 5GS optimization is supported and/or an S-NSSAI for which use of the function is accepted, and may configure the selected S-NSSAI for the 52nd identification information. Note that selection of the S-NSSAI need not be limited to these.

In addition, by transmitting the 53rd identification information, the SMF and the AMF may indicate establishment of a PDU session of an SSC mode indicated by the 53rd identification information, or may indicate an SSC mode associated with a PDU session to be established. In addition, by transmitting the 53rd identification information, the SMF and the AMF may indicate that the request for establishment of a PDU session of an SSC mode indicated by the 43rd identification information is accepted. Note that the SSC mode indicated by the 53rd identification information may be one of "SSC mode 1", "SSC mode 2", and "SSC mode 3".

Here, in a case that the SMF receives the 43rd identification information, the SMF may determine the SSC mode indicated by the 43rd identification information as the SSC mode associated with a PDU session to be established, based on subscriber information and/or configuration information of the SMF. In addition, in a case that the SMF does not receive the 43rd identification information, the SMF may determine the default SSC mode and/or the SSC mode associated with configuration information of the SMF as the SSC mode associated with a PDU session to be established. In addition, the SMF may configure the SSC mode associated with a PDU session to be established for the 53rd identification information.

In addition, in a case that the SMF can use control plane CIoT 5GS optimization, the SMF may determine SSC mode 1 as the SSC mode associated with a PDU session to be established. In this case, the 53rd identification information may be information indicating SSC mode 1. In addition, even in a case that the SMF can use control plane CIoT 5GS optimization, the SMF may determine SSC mode 2 or SSC mode 3 as the SSC mode associated with a PDU session to be established. In this case, the 53rd identification information may be information indicating SSC mode 2 or SSC mode 3. In addition, in a case that the SMF can use control plane CIoT 5GS optimization, the SMF may determine that the SMF does not apply the SSC mode to the PDU session to be established. In this case, any SSC mode may be configured for the 53rd identification information, or transmission and/or reception of the 53rd identification information may be omitted.

Note that the SMF and the AMF may select and determine at least which piece of identification information out of the 51st identification information to the 53rd identification information is to be included in the PDU session establishment accept message, based on each piece of received identification information, and/or subscriber information, and/or capability information of the network, and/or an operator policy, and/or a state of the network, and/or registration information of a user, and/or a context stored in the AMF, and/or the like.

The SMF and the AMF can include a DNN corresponding to the DN allowed to be connected by the UE in the PDU session establishment accept message. Note that, in a case that the PDU session to be established is a PDU session for the LADN, the SMF and the AMF may include the LADN DNN in the PDU session establishment accept message.

The SMF and the AMF can include the selected and/or allowed PDU session ID in the PDU session establishment accept message. The SMF and the AMF can specify a PDU session type indicating a type of the selected and/or allowed PDU session. As the PDU session type, as described above, one of IPv4, IPv6, IP, Ethernet, and Unstructured can be specified. The SMF and the AMF can include the SSC mode of the selected and/or allowed PDU session in the PDU session establishment accept message.

In addition, the SMF and the AMF can include an approved QoS rule group in the PDU session establishment accept message. Note that the approved QoS rule group may include one or multiple QoS rules. In addition, in the present procedure, in a case that multiple QoS flows and/or user plane radio bearers are established, the approved QoS rule group may include multiple QoS rules. In contrast, in the present procedure, in a case that only one QoS flow and/or user plane radio bearer is established, the approved QoS rule group may include one QoS rule.

In addition, in a case that configuration information of the header compression function is included in the PDU session establishment request message, the SMF and/or the AMF may transmit the configuration information of the header compression function on the PDU session establishment accept message.

In addition, the SMF may transmit information indicating that a part of the request from the UE is rejected on the PDU session establishment accept message, or may transmit information indicating that a part of the request from the UE is rejected so as to indicate a reason of rejection of the part of the request from the UE. In addition, by receiving the information indicating that the part of the request of the UE is rejected, the UE may recognize the reason of rejection of the part of the request from the UE. Note that the reason for rejection may be information indicating that details indicated by the identification information received by the SMF are not allowed.

After the UE receives the NAS message including the PDU session establishment accept message from the AMF via the N1 interface (S912), the UE transmits a PDU session establishment complete message to the SMF via the AMF (S914) (S916). By receiving the PDU session establishment accept message, the UE can detect that the request from the UE represented by the PDU session establishment request is accepted.

Specifically, the UE transmits the PDU session establishment complete message to the AMF via the N1 interface (S914). After the AMF receives the PDU session establishment complete message from the UE, the AMF transmits a PDU session establishment complete message to the SMF via the N11 interface (S916).

Note that the PDU session establishment complete message that is transmitted by the AMF to the SMF may be a response message to the PDU session establishment accept message that is transmitted from the SMF to the AMF in S910. The PDU session establishment complete message may be a NAS message. The PDU session establishment complete message may be a message indicating that the PDU session establishment procedure completes.

After the SMF receives the PDU session establishment complete message from the AMF via the N11 interface (S916), the SMF can perform the 2nd condition determination. The 2nd condition determination is a condition determination for determining a type of a transmitted and/or received message on the N4 interface. In a case that the 2nd condition determination is true, the SMF transmits a session modification request message to the UPF via the N4 interface (S918), and then receives a session modification accept message transmitted from the UPF as a response message to the session modification request message (S920). In a case that the 2nd condition determination is false, the SMF transmits a session establishment request message to the UPF via the N4 interface (S918), and then receives a session modification accept message transmitted from the UPF as a response message to the session establishment request message (S920).

Note that the 2nd condition determination may be performed based on whether or not a session on the N4 interface for a PDU session is established. For example, in a case that a session on the N4 interface for a PDU session is established, the 2nd condition determination may be true, whereas in a case that a session on the N4 interface for a PDU session is not established, the 2nd condition determination may be false. Note that the conditions on which true or false of the 2nd condition determination is determined need not be limited to the conditions described above.

Each apparatus completes the procedure of (A) in the PDU session establishment procedure, based on transmission and/or reception of the PDU session establishment accept message, and/or transmission and/or reception of the PDU session establishment complete message, and/or transmission and/or reception of the session modification response message, and/or transmission and/or reception of the session establishment response message. In a case that the procedure of (A) of the present procedure has completed, the UE is in a state in which a PDU session with respect to the DN is established.

Next, steps of the procedure of (B) in the PDU session establishment procedure will be described. The SMF transmits a PDU session establishment reject message to the UE via the AMF (S922) (S924). Specifically, the SMF transmits the PDU session establishment reject message to the AMF via the N11 interface (S922). After the AMF receives the PDU session establishment request message from the SMF via the N11 interface (S922), the AMF transmits the PDU session establishment reject message to the UE via the N1 interface (S924).

Note that the PDU session establishment reject message may be a NAS message. The PDU session establishment reject message may be a message indicating that establishment of a PDU session is rejected.

Here, by transmitting the PDU session establishment reject message, the SMF may indicate that the request from the UE represented by the PDU session establishment request is rejected. In addition, the SMF may transmit information indicating a reason of rejection on the PDU session establishment reject message, or may transmit a reason of rejection so as to indicate the reason of rejection. In addition, the SMF may transmit a value of the back-off timer on the PDU session establishment reject message.

In addition, by receiving the information indicating the reason of rejection of the request from the UE, the UE may recognize the reason of rejection of the request from the UE. Note that the reason for rejection may be information indicating that details indicated by the identification information received by the SMF are not allowed.

The UE may start counting of the back-off timer, based on reception of the PDU session establishment reject message. Here, the back-off timer started by the UE may use a back-off timer value received from the network, or may use a timer value stored in the UE. While the UE performs at least counting of the back-off timer, the UE need not initiate the PDU session establishment procedure again, may stop the PDU session establishment procedure, or may be prohibited from performing the PDU session establishment procedure.

In addition, the UE may delete stored information, based on reception of the PDU session establishment reject message.

By receiving the PDU session establishment reject message, the UE can recognize that the request from the UE represented by the PDU session establishment request is rejected, and details of various pieces of identification information included in the PDU session establishment reject message.

Figure 7:
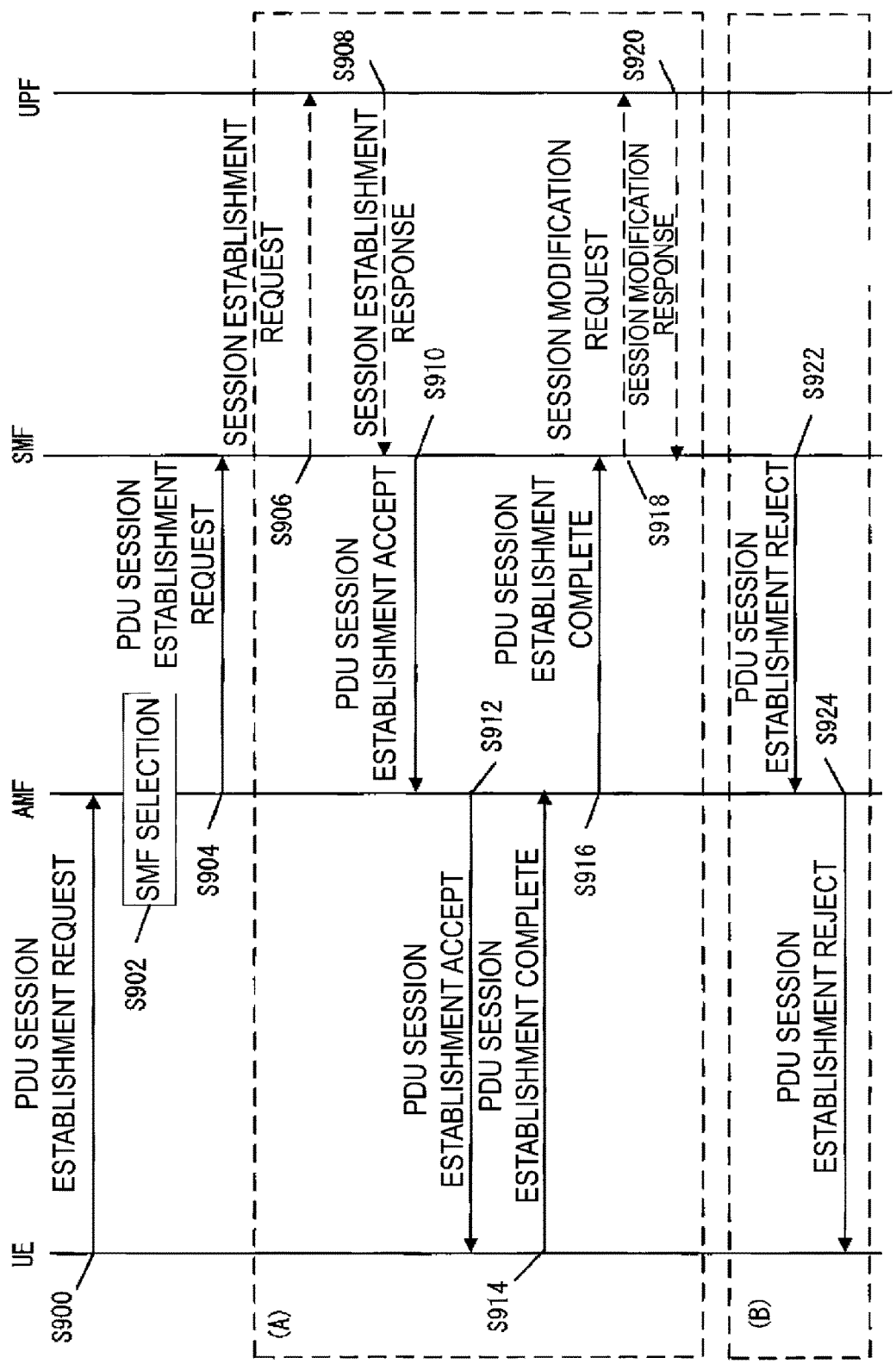
FIG. 7 is a diagram illustrating a PDU session establishment procedure.

Each apparatus completes the PDU session establishment procedure, based on completion of the procedure of (A) or (B) of FIG. 7. Note that each apparatus may transition to a state in which a PDU session is established, based on completion of the procedure of (A) of FIG. 7, or may recognize that the PDU session establishment procedure is rejected or may transition to a state in which a PDU session is not established, based on completion of the procedure of (B) of FIG. 7. In addition, after completing the procedure of (A) of FIG. 7, the UE can communicate with the DN using the established PDU session.

In addition, each apparatus may perform processing based on information transmitted and/or received in the PDU session establishment procedure, based on completion of the PDU session establishment procedure. For example, in a case that each apparatus transmits and/or receives information indicating that a part of the request from the UE is rejected, each apparatus may recognize a reason of rejection of the request from the UE. In addition, each apparatus may perform the present procedure again or may perform the PDU session establishment procedure with respect to another cell, based on the reason of rejection of the request from the UE.

In addition, based on completion of the PDU session establishment procedure, the UE may store identification information received together with the PDU session establishment accept message and/or the PDU session establishment reject message, or may recognize determination of the network.

For example, in a case that the UE receives the 51st identification information, the UE may recognize that establishment of a PDU session in which only control plane CIoT 5GS optimization can be used is accepted. In addition, in a case that the UE receives the 52nd identification information, the UE may recognize that establishment of a PDU session associated with the S-NSSAI is accepted.

In a case that the UE receives the PDU session establishment reject message as a response to the PDU session establishment request message including the 41st identification information, the UE may recognize that establishment of a PDU session in which only control plane CIoT 5GS optimization can be used is rejected or is not possible.

In addition, in a case that the UE receives the PDU session establishment reject message as a response to the PDU session establishment request message including the 42nd identification information, the UE may recognize that establishment of a PDU session associated with an S-NSSAI indicated by the 42nd identification information is rejected or is not possible.

In addition, in a case that the UE receives the PDU session establishment reject message, the UE may transmit the PDU session establishment request message not including the 41st identification information to the network, or may transmit the PDU session establishment request message including the 42nd identification information indicating an S-NSSAI different from the S-NSSAI indicated by the previously transmitted 42nd identification information to the network.

In addition, in a case that the UE establishes a PDU session in which the procedure for establishing a user plane radio bearer can be performed, the UE may initiate the service request procedure in order to establish a user plane radio bearer of the PDU session.

In addition, in a case that the UE receives the 53rd identification information, the UE may recognize that a PDU session of an SSC mode indicated by the 53rd identification information is established, or may recognize an SSC mode associated with a PDU session to be established. In addition, in a case that the UE receives the 53rd identification information, the UE may store the SSC mode indicated by the 53rd identification information in a context of the PDU session to be established. In addition, in a case that the UE receives the 53rd identification information, the UE may recognize that the request for establishment of a PDU session of the SSC mode indicated by the 43rd identification information is accepted.

In addition, in a case that the UE does not receive the 53rd identification information, the UE may recognize that the SSC mode is not applied to the PDU session to be established. In addition, even in a case that the UE receives the 53rd identification information, in a case that the UE can use control plane CIoT 5GS optimization, the UE may ignore the 53rd identification information, or may delete the SSC mode from the context of the PDU session to be established.

Note that, even in a case that the UE can use control plane CIoT 5GS optimization, the UE may recognize that the SSC mode indicated by the 53rd identification information is the SSC mode associated with the PDU session to be established, or may store the SSC mode indicated by the 53rd identification information in the context of the PDU session to be established.

In addition, in a case that the UE receives the LADN DNN, the UE may recognize that a PDU session for the LADN is established, may regard the PDU session to be established as a PDU session for the LADN DNN, may store the LADN DNN in the context of the PDU session to be established, or may regard the PDU session to be established as a PDU session for the LADN DNN.

In addition, in a case that the UE receives the approved QoS rule group including multiple QoS rules, the UE may recognize that QoS processing can be performed in the PDU session to be established. In addition, in a case that the UE receives the approved QoS rule group including multiple QoS rules, in the present procedure, the UE may recognize that multiple QoS flows are established, or may recognize that multiple user plane radio bearers are established. In contrast, in a case that the UE receives the approved QoS rule group including one QoS rule, in the present procedure, the UE may recognize that one QoS flow is established, or may recognize that one user plane radio bearer is established.

3.2.3. UE Configuration Update Procedure

Figure 8:
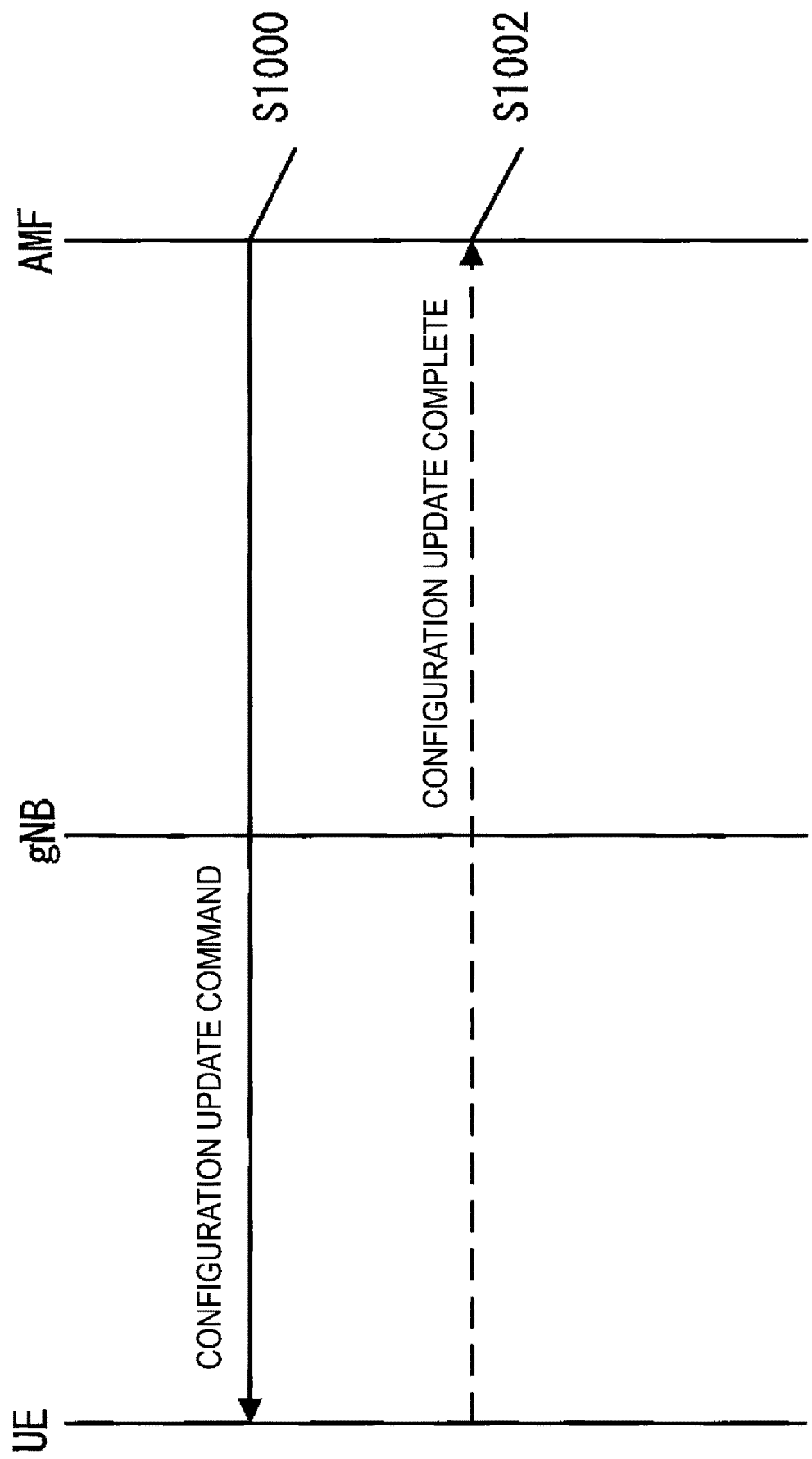
FIG. 8 is a diagram illustrating a UE configuration update procedure.

Next, the UE configuration update procedure (Generic UE configuration update procedure) will be described with reference to FIG. 8. The UE configuration update procedure is hereinafter also referred to as the present procedure. The present procedure is a procedure for the core network to update configuration information of the UE. The present procedure may be a procedure for mobility management that is initiated by the network with respect to the UE registered with the network.

In addition, the apparatus in the core network, such as the AMF, may initiate the present procedure, based on update of a configuration of the network and/or update of an operator policy. Note that a trigger of the present procedure may be detection of mobility of the UE, may be detection of state change of the UE, and/or the access network, and/or the core network, or may be state change of the network slice. In addition, the trigger of the present procedure may be reception of a request from the DN and/or an application server of the DN, change of a configuration of the network, or may be change of an operator policy. In addition, the trigger of the present procedure may be expiration of the operating timer. Note that the trigger for the apparatus in the core network to initiate the present procedure is not limited to these. In other words, the present procedure may be performed at any timing after the above-described registration procedure and/or PDU session establishment procedure completes. In addition, the present procedure may be performed at any timing on the condition that each apparatus is in a state in which each apparatus has established a 5GMM context and/or each apparatus is in a state in which each apparatus is in the 5GMM connected mode.

In addition, the trigger of the present procedure may be a fact that restriction of communication of user data via the control plane becomes necessary. More specifically, the trigger of the present procedure may be a fact that restriction of communication of user data via the control plane becomes necessary due to congestion of the network.

Conversely, the trigger of the present procedure may be a fact that restriction of communication of user data via the control plane becomes unnecessary. More specifically, the trigger of the present procedure may be a fact that restriction of communication of user data via the control plane becomes unnecessary due to relief of congestion of the network.

During the present procedure, each apparatus may transmit and/or receive a message including identification information for changing configuration information of the UE and/or identification information for stopping or changing the function being performed by the UE. In addition, based on completion of the present procedure, each apparatus may update the configuration information to a configuration specified by the network, or may start a behaviour specified by the network.

The UE may update the configuration information of the UE, based on the control information transmitted and/or received in the present procedure. In addition, the UE may stop the function being performed, or may start a new function, along with the update of the configuration information of the UE. In other words, the apparatus in the core network may initiate the present procedure and further transmit a control message and control information of the present procedure to the UE so as to cause the UE to update the configuration information of the UE that can be identified using these pieces of control information. In addition, by causing update of the configuration information of the UE, the apparatus in the core network may cause stop of the function being performed by the UE, or may cause the UE to start a new function.

First, the AMF initiates the UE configuration update procedure, by sending a Configuration update command message to the UE via the 5G AN (or the gNB) (S1000).

The AMF may transmit at least one or more pieces of identification information out of the 61st identification information to the 69th identification information, the 121st identification information, and the 122nd identification information on the registration accept message. Note that, by transmitting these pieces of identification information, the AMF may indicate new configuration information of the UE, or may request update of the configuration information of the UE. In addition, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting the 61st identification information, the AMF may indicate new information of CIoT 5GS optimization, or may indicate invalidation of information of CIoT 5GS optimization stored in the UE. In addition, by transmitting the 61st identification information, the AMF may indicate that CIoT 5GS optimization currently in use needs to be updated, may request change of CIoT 5GS optimization currently in use, or may indicate changed CIoT 5GS optimization.

In addition, by transmitting the 62nd identification information, the AMF may indicate new support information of control plane CIoT 5GS optimization, or may indicate invalidation of support information of control plane CIoT 5GS optimization stored in the UE. In addition, by transmitting the 62nd identification information, the AMF may request change of support information of control plane CIoT 5GS optimization, or may indicate changed support information of control plane CIoT 5GS optimization.

In addition, by transmitting the 63rd identification information, the AMF may indicate new support information of user plane CIoT 5GS optimization, or may indicate invalidation of support information of user plane CIoT 5GS optimization stored in the UE. In addition, by transmitting the 63rd identification information, the AMF may request change of support information of user plane CIoT 5GS optimization, or may indicate changed support information of user plane CIoT 5GS optimization.

In addition, by transmitting the 64th identification information, the AMF may indicate new support information of data communication using a communication path of the user plane, or may indicate invalidation of support information of data communication using a communication path of the user plane stored in the UE. In addition, by transmitting the 64th identification information, the AMF may request change of support information of data communication using a communication path of the user plane, or may indicate changed support information of data communication using a communication path of the user plane.

In addition, by transmitting one or more pieces of identification information out of the 61st identification information and/or the 62nd identification information to the 64th identification information, the UE may indicate that CIoT 5GS optimization currently in use needs to be changed, or may request that CIoT 5GS optimization currently in use be changed to CIoT 5GS optimization indicated by the identification information.

Specifically, by transmitting the 61st identification information and/or the 62nd identification information, the AMF may request that CIoT 5GS optimization currently in use be changed to control plane CIoT 5GS optimization. In this case, the 61st identification information may be information indicating control plane CIoT 5GS optimization. In addition, the 62nd identification information may be information indicating support of control plane CIoT 5GS optimization.

In addition, by transmitting the 61st identification information, and/or the 63rd identification information, and/or the 64th identification information, the AMF may request that CIoT 5GS optimization currently in use be changed to user plane CIoT 5GS optimization. In this case, the 61st identification information may be information indicating user plane CIoT 5GS optimization. In addition, the 63rd identification information may be information indicating support of user plane CIoT 5GS optimization. In addition, the 64th identification information may be information indicating support of data communication using a communication path of the user plane.

In addition, by transmitting the 65th identification information, the AMF may indicate new support information of Header compression for control plane CIoT 5GS optimization, or may indicate invalidation of support information of Header compression for control plane CIoT 5GS optimization stored in the UE. In addition, by transmitting the 65th identification information, the AMF may request change of support information of Header compression for control plane CIoT 5GS optimization, or may indicate changed support information of Header compression for control plane CIoT 5GS optimization.

In addition, by transmitting the 66th identification information, the AMF may indicate new information of use restriction of coverage enhancement, or may indicate invalidation of information of use restriction of coverage enhancement stored in the UE. In addition, by transmitting the 66th identification information, the AMF may request change of information of use restriction of coverage enhancement, or may indicate changed information of use restriction of coverage enhancement. Note that the information of use restriction of coverage enhancement may be information indicating whether or not use of coverage enhancement is restricted, or may be support information of use restriction of coverage enhancement.

In addition, by transmitting the 67th identification information, the AMF may indicate new support information of 5GMM-CONNECTED mode with RRC inactive indication, or may indicate invalidation of support information of 5GMM-CONNECTED mode with RRC inactive indication stored in the UE. In addition, by transmitting the 67th identification information, the AMF may request change of support information of 5GMM-CONNECTED mode with RRC inactive indication, or may indicate changed support information of 5GMM-CONNECTED mode with RRC inactive indication.

In addition, by transmitting the 121st identification information, the AMF may notify the UE of a new value of the back-off timer C, or may notify the UE that a value of the back-off timer C is to be updated. In addition, by transmitting the 121st identification information, the AMF may command the UE to configure a value indicated by the 121st identification information for the back-off timer C, or may command the UE to start the back-off timer C configured with the value indicated by the 121st identification information. Here, in a case that the back-off timer C operates in the UE, the AMF may command the UE to stop the back-off timer C, and then start the back-off timer C configured with the value indicated by the 121st identification information.

Conversely, in a state in which the back-off timer C operates in the UE, the AMF may command the UE to stop the operating back-off timer C by not transmitting the 121st identification information. In other words, in order to command the UE to stop the operating back-off timer C, the AMF may transmit the configuration update command message not including the 121st identification information to the UE.

Note that, in a case that the UE uses control plane CIoT 5GS optimization and/or a case that the UE supports control plane CIoT 5GS optimization, the AMF may include the 121st identification information in the configuration update command message.

In addition, by transmitting the 121st identification information and/or the 122nd identification information, the AMF may notify the UE of a new range to which restriction of communication of user data via the control plane is applied, or may notify the UE that the range to which restriction of communication of user data via the control plane is applied is updated. In other words, by transmitting the 121st identification information and/or the 122nd identification information, the AMF may indicate a range in which the back-off timer C configured with the 121st identification information is effective, or may indicate a range in which congestion control using the back-off timer C configured with the 121st identification information operating in the UE is effective.

Note that, in a case that the AMF uses control plane CIoT 5GS optimization and/or supports control plane CIoT 5GS optimization, the AMF may include the 121st identification information and/or the 122nd identification information in the configuration update command message.

In addition, in a procedure such as the registration procedure, in a case that the UE sends out a notification that the UE supports the back-off timer for communication of user data via the control plane and the AMF determines activation of congestion control for communication of user data via the control plane, the AMF may include the 121st identification information and/or the 122nd identification information in the configuration update command message. In other words, in a procedure such as the registration procedure, in a case that the AMF receives the 101st identification information from the UE and activates congestion control using the back-off timer C, the AMF may include the 121st identification information and/or the 122nd identification information in the configuration update command message. In this case, the 101st identification information may be information indicating support of the back-off timer for communication of user data via the control plane.

In addition, in a case that the AMF includes the 121st identification information and/or the 122nd identification information in the configuration update command message, the AMF may store time in which the back-off timer C is operated for each UE. In addition, in a case that the AMF includes the 121st identification information and/or the 122nd identification information in the configuration update command message, the AMF may store the effective range of the back-off timer C for each UE.

In contrast, in a case that the AMF determines activation of congestion control for communication of user data via the control plane, the AMF need not include the 121st identification information and/or the 122nd identification information in the configuration update command message. In other words, in a case that the AMF deactivates congestion control using the back-off timer C, the AMF need not include the 121st identification information and/or the 122nd identification information in the configuration update command message.

In addition, in a case that the AMF does not include the 121st identification information and/or the 122nd identification information in the configuration update command message, the AMF may release the time in which the back-off timer C is operated that is stored for each UE. In addition, in a case that the AMF includes the 121st identification information and/or the 122nd identification information in the configuration update command message, the AMF may release the effective range of the back-off timer C stored for each UE.

In addition, by transmitting the 69th identification information, the AMF may indicate that the registration procedure needs to be performed. In addition, by transmitting the 69th identification information as well as one or more pieces of identification information out of the 61st identification information to the 67th identification information, the 121st identification information, and the 122nd identification information, the AMF may request that the registration procedure be performed, or may indicate that renegotiation of each piece of information is needed. In addition, in a case that the AMF includes one or more pieces of identification information out of the 61st identification information to the 67th identification information, the 121st identification information, and the 122nd identification information in the configuration update command message, the AMF may also transmit the 69th identification information on the configuration update command message.

Note that the AMF may select and determine which piece of identification information out of the 61st identification information to the 69th identification information, the 121st identification information, and the 122nd identification information is to be included in the configuration update command message, based on each piece of received identification information, and/or subscriber information, and/or capability information of the network, and/or an operator policy, and/or a state of the network, and/or registration information of a user, and/or a context stored in the AMF, and/or the like.

By transmitting the configuration update command message based on each piece of received identification information, and/or subscriber information, and/or capability information of the network, and/or an operator policy, and/or a state of the network, and/or registration information of a user, and/or a context stored in the AMF, and/or the like, the AMF may indicate a request for update of the configuration information of the UE.

The UE receives the configuration update command message via the 5G AN (gNB) (S1000). The UE may update the configuration information of the UE, based on the configuration update command message, and/or identification information included in the configuration update command message. In addition, the UE may transmit a Configuration update complete message to the AMF via the 5G AN (gNB) as a response message to the configuration update command message, based on the identification information included in the configuration update command message (S1002).

In a case that the UE transmits the configuration update command message, the AMF receives the configuration update complete message via the 5G AN (gNB) (S810). Each apparatus completes the present procedure, based on transmission and/or reception of the configuration update command message and/or the configuration update complete message.

Note that each type of processing performed by the UE based on reception of each piece of identification information described above may be performed during the present procedure or after completion of the present procedure, or may be performed based on completion of the present procedure after completion of the present procedure. In addition, the UE may transmit a Configuration update complete message to the AMF via the 5G AN (gNB) as a response message to the configuration update command message, based on the identification information included in the configuration update command message (S1002).

In a case that the UE transmits the configuration update complete command message, the AMF receives the configuration update complete message via the 5G AN (gNB) (S1002). Each apparatus completes the present procedure, based on transmission and/or reception of the configuration update command message and/or the configuration update complete message.

In addition, based on completion of the present procedure, each apparatus may perform processing based on information transmitted and/or received in the present procedure. For example, in a case that update information for configuration information is transmitted and/or received, each apparatus may update the configuration information. In addition, in a case that information indicating that the registration procedure needs to be performed is transmitted and/or received, the UE may initiate the registration procedure, based on completion of the present procedure.

In addition, based on completion of the present procedure, the UE may store identification information received together with the configuration information command message, or may recognize determination of the network.

For example, by receiving the 61st identification information, the UE may recognize that information indicated by the 61st identification information is new information of CIoT 5GS optimization, or may recognize the new information of CIoT 5GS optimization is valid. In addition, by receiving the 61st identification information, the UE may store new information of CIoT 5GS optimization, or may recognize that stored information of CIoT 5GS optimization is invalid. Note that the information of CIoT 5GS optimization may be information indicating CIoT 5GS optimization in use. In addition, by receiving the 61st identification information, the UE may validate new information of CIoT 5GS optimization, or may invalidate stored information of CIoT 5GS optimization.

In addition, by receiving the 62nd identification information, the UE may recognize that information indicated by the 62nd identification information is new support information of control plane CIoT 5GS optimization, or may recognize that the new support information of control plane CIoT 5GS optimization is valid. In addition, by receiving the 62nd identification information, the UE may store new support information of control plane CIoT 5GS optimization, or may recognize that stored support information of control plane CIoT 5GS optimization is invalid. In addition, by receiving the 62nd identification information, the UE may validate new support information of control plane CIoT 5GS optimization, or may invalidate stored support information of control plane CIoT 5GS optimization.

In addition, by receiving the 63rd identification information, the UE may recognize that information indicated by the 63rd identification information is new support information of user plane CIoT 5GS optimization, or may recognize that the new support information of user plane CIoT 5GS optimization is valid. In addition, by receiving the 63rd identification information, the UE may store new support information of user plane CIoT 5GS optimization, or may recognize that stored support information of user plane CIoT 5GS optimization is invalid. In addition, by receiving the 63rd identification information, the UE may validate new support information of user plane CIoT 5GS optimization, or may invalidate stored support information of user plane CIoT 5GS optimization.

In addition, by receiving the 64th identification information, the UE may recognize that information indicated by the 64th identification information is new support information of data communication using a communication path of the user plane, or may recognize that the new support information of data communication using a communication path of the user plane is valid. In addition, by receiving the 64th identification information, the UE may store new support information of data communication using a communication path of the user plane, or may recognize that stored support information of data communication using a communication path of the user plane is invalid. In addition, by receiving the 64th identification information, the UE may validate new support information of data communication using a communication path of the user plane, or may invalidate stored support information of data communication using a communication path of the user plane.

In addition, by receiving one or more pieces of identification information out of the 61st identification information and/or the 62nd identification information to the 64th identification information, the UE may recognize that CIoT 5GS optimization currently in use needs to be changed, or may change CIoT 5GS optimization currently in use to CIoT 5GS optimization indicated by the received identification information.

Specifically, by receiving the 61st identification information and/or the 62nd identification information, the UE may change CIoT 5GS optimization currently in use to control plane CIoT 5GS optimization. In this case, the 61st identification information may be information indicating control plane CIoT 5GS optimization. In addition, the 62nd identification information may be information indicating support of control plane CIoT 5GS optimization.

In addition, by receiving the 61st identification information, and/or the 63rd identification information, and/or the 64th identification information, the UE may change CIoT 5GS optimization currently in use to user plane CIoT 5GS optimization. In this case, the 61st identification information may be information indicating user plane CIoT 5GS optimization. In addition, the 63rd identification information may be information indicating support of user plane CIoT 5GS optimization. In addition, the 64th identification information may be information indicating support of data communication using a communication path of the user plane.

In addition, by receiving the 65th identification information, the UE may recognize that information indicated by the 65th identification information is new support information of Header compression for control plane CIoT 5GS optimization, or may recognize that the new support information of Header compression for control plane CIoT 5GS optimization is valid. In addition, by receiving the 65th identification information, the UE may store new support information of Header compression for control plane CIoT 5GS optimization, or may recognize that stored support information of Header compression for control plane CIoT 5GS optimization is invalid. In addition, by receiving the 65th identification information, the UE may validate new support information of Header compression for control plane CIoT 5GS optimization, or may invalidate stored support information of Header compression for control plane CIoT 5GS optimization.

In addition, by receiving the 66th identification information, the UE may recognize that information indicated by the 66th identification information is new information of use restriction of coverage enhancement, or may recognize that the new information of use restriction of coverage enhancement is valid. In addition, by receiving the 66th identification information, the UE may store new information of use restriction of coverage enhancement, or may recognize that stored information of use restriction of coverage enhancement is invalid. In addition, by receiving the 66th identification information, the UE may validate new information of use restriction of coverage enhancement, or may invalidate stored information of use restriction of coverage enhancement.

Note that the information of use restriction of coverage enhancement may be information indicating whether or not use of coverage enhancement is restricted, or may be support information of use restriction of coverage enhancement. In other words, by receiving the 66th identification information, the UE may transition to a state in which use of coverage enhancement is restricted or may transition to a state in which use of coverage enhancement is not restricted, based on the 66th identification information.

In addition, by receiving the 67th identification information, the UE may recognize that information indicated by the 67th identification information is new support information of 5GMM-CONNECTED mode with RRC inactive indication, or may recognize that the new support information of 5GMM-CONNECTED mode with RRC inactive indication is valid. In addition, by receiving the 67th identification information, the UE may store new support information of 5GMM-CONNECTED mode with RRC inactive indication, or may recognize that stored support information of 5GMM-CONNECTED mode with RRC inactive indication is invalid. In addition, by receiving the 67th identification information, the UE may validate new support information of 5GMM-CONNECTED mode with RRC inactive indication, or may invalidate stored support information of 5GMM-CONNECTED mode with RRC inactive indication.

In addition, in a case that the UE receives the 121st identification information, the UE may recognize that a value indicated by the 121st identification information is a new value of the back-off timer C, or may recognize that a value of the back-off timer C is updated.

In addition, in a case that the UE receives the 121st identification information, the UE may configure the value indicated by the 121st identification information for the back-off timer C, or may start the back-off timer C configured with the value indicated by the 121st identification information. Here, in a case that the back-off timer C operates, the UE may stop the back-off timer C, and then start the back-off timer C configured with the value indicated by the 121st identification information.

In contrast, in a case that the UE does not receive the 121st identification information in a state in which the back-off timer C operates, the UE may stop the operating back-off timer C.

Note that, in a case that the UE uses control plane CIoT 5GS optimization, the UE may perform the above-described processing of a case that the UE receives the 121st identification information. In contrast, in a case that the UE does not use control plane CIoT 5GS optimization, the UE may ignore the received 121st identification information.

In addition, in a case that the UE receives the 121st identification information and/or the 122nd identification information, the UE may recognize a range to which restriction of communication of user data via the control plane is applied. In other words, in a case that the UE receives the 121st identification information and/or the 122nd identification information, the UE may recognize a range in which the back-off timer C configured with the 121st identification information is effective, or may recognize a range in which congestion control using the back-off timer C configured with the 121st identification information is effective.

Note that, in a case that the UE uses control plane CIoT 5GS optimization, the UE may perform the above-described processing of a case that the UE receives the 121st identification information and/or the 122nd identification information. In contrast, in a case that the UE does not use control plane CIoT 5GS optimization, the UE may ignore the received 121st identification information and/or 122nd identification information.

In addition, by receiving the 69th identification information, the UE may recognize that the registration procedure needs to be performed. In addition, by receiving the 69th identification information as well as one or more pieces of identification information out of the 61st identification information to the 67th identification information, the 121st identification information, and the 122nd identification information, the UE may initiate the registration procedure after completion of the present procedure, or may renegotiate each piece of information between the UE and the network by performing the registration procedure. In addition, by receiving the 69th identification information as well as one or more pieces of identification information out of the 61st identification information to the 67th identification information, the 121st identification information, and the 122nd identification information, the UE may transmit the configuration update complete message to the AMF, and in the above procedure, through transmission and/or reception of a session management request message initiated by the network, the apparatus in the core network can command the UE to update the configuration information that has already been applied by the UE, and can command the UE to stop or change the function being performed by the UE.

3.2.4. Service Request Procedure

Figure 9:
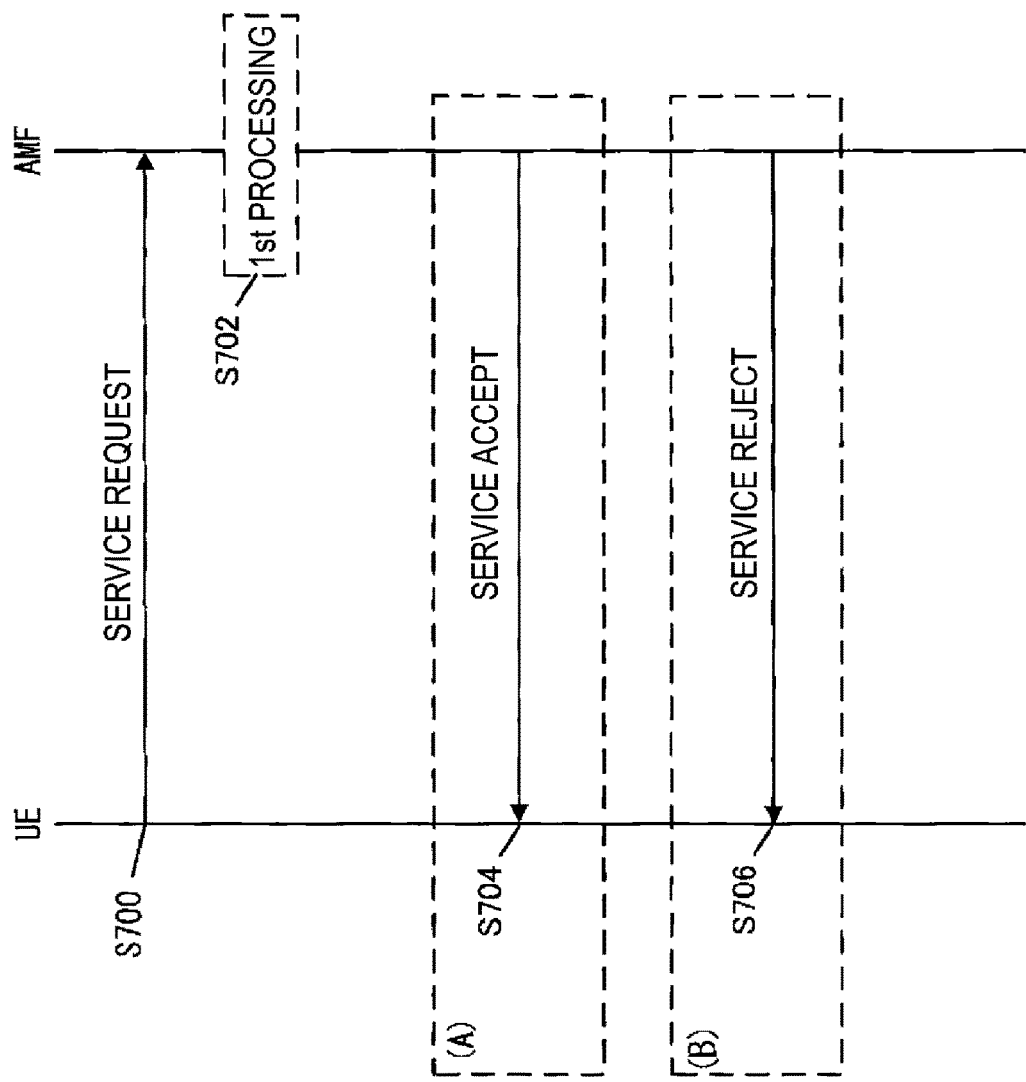
FIG. 9 is a diagram illustrating a service request procedure.

First, the Service request procedure will be described with reference to FIG. 9. The service request procedure is a procedure in the 5GS. The present procedure hereinafter refers to the service request procedure. The service request procedure is a procedure initiated by the UE, and the service request procedure may be a procedure for transitioning the state of the UE from the idle mode to the connected mode. In addition, the service request procedure is not limited to these, and may be a procedure that can be performed at any timing. Each apparatus (in particular, the UE and the AMF) can transition to the connected mode, based on completion of the service request procedure.

In addition, the service request procedure may be a procedure for implementing communication of user data via the control plane. More specifically, the service request procedure may be a procedure for implementing communication of user data via the control plane in a case that the UE is in the idle mode.

The UE may initiate the present procedure in a case that an running timer expires. In addition, the UE may initiate the service request procedure in a case that a context of each apparatus needs to be updated due to disconnection and deactivation of a PDU session. In addition, in a case that there is a change in capability information and/or a preference related to PDU session establishment of the UE, the UE may initiate the service request procedure. In addition, the UE may initiate the service request procedure in order to start communication of user data via the control plane. In addition, the UE may initiate the service request procedure, based on reception of Paging and a Notification message. Note that these are not restrictive, and the UE can perform the service request procedure at any timing on the condition that the UE has received the registration accept message and completed the registration procedure.

First, the UE transmits a Service request message to the AMF (S700). Note that the service request message is a NAS message transmitted and/or received on the N1 interface; however, between the UE and the 5G AN (gNB), the service request message is transmitted and/or received on an RRC message.

Here, the UE may transmit user data on the service request message. More specifically, the UE may transmit an SM message including user data on the service request message. Here, the SM message may be a message used for communication of user data via the control plane. In addition, the SM message may be a 5GSM DATA TRANSPORT message. In addition, in this case, the service request message may be a Control plane service request message.

The AMF receives the service request message. The AMF performs the 1st processing, based on reception of the service request message (S702). In the 1st processing, the AMF determines whether or not the AMF accepts the service request from the UE. In the 1st processing, in a case that the AMF accepts the service request from the UE, the AMF performs the procedure of (A) of FIG. 7. In contrast, in the 1st processing, in a case that the AMF rejects the service request from the UE, the AMF performs the procedure of (B) of FIG. 7. A method of determining whether or not the service request from the UE is accepted in the 1st processing may be determined based on reception of the service request message, and/or each piece of identification information included in the service request message, and/or subscriber information, and/or capability information of the network, and/or an operator policy, and/or a state of the network, and/or registration information of a user, and/or a context stored in the AMF, and/or the like.

For example, in a case that the AMF allows a request for communication of user data via the control plane, the AMF may accept the service request from the UE. In contrast, in a case that the AMF does not allow the request for communication of user data via the control plane, the AMF may reject the service request from the UE.

First, a case that the AMF accepts the service request from the UE will be described. The AMF transmits a service accept message to the UE, based on reception of the service request message and/or the 1st processing (S704).

Next, a case that the AMF rejects the service request from the UE will be described. The AMF transmits a service reject message to the UE, based on reception of the service request message and/or the 1st processing (S706).

Here, the AMF may transmit the 111th identification information and/or the 112th identification information on the service accept message and/or the service reject message. In addition, the AMF may include a cause value indicating a reason of rejection of the service request on the service reject message. Note that, by transmitting these pieces of identification information, the AMF may indicate results of the service request procedure. In addition, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

By transmitting the 111th identification information, the AMF may notify the UE of a value of the back-off timer C. In addition, by transmitting the 111th identification information, the AMF may command the UE to configure the value indicated by the 111th identification information for the back-off timer C, or may command the UE to start the back-off timer C configured with the value indicated by the 111th identification information. Here, in a case that the back-off timer C operates in the UE, the AMF may command the UE to stop the back-off timer C, and then start the back-off timer C configured with the value indicated by the 111th identification information.

Conversely, in a state in which the back-off timer C operates in the UE, the AMF may command the UE to stop the operating back-off timer C by not transmitting the 111th identification information. More specifically, in a case that the UE initiates the present procedure in the idle mode, the AMF may command the UE to stop the operating back-off timer C by not transmitting the 111th identification information. In other words, in order to command the UE to stop the operating back-off timer C, the AMF may transmit the service accept message not including the 111th identification information to the UE.

Note that, in a case that the UE uses control plane CIoT 5GS optimization and/or a case that the UE supports control plane CIoT 5GS optimization, the AMF may include the 111th identification information in the service accept message and/or the service reject message.

In addition, by transmitting the 111th identification information and/or the 112th identification information, the AMF may notify the UE of a range to which restriction of communication of user data via the control plane is applied. In other words, by transmitting the 111th identification information and/or the 112th identification information, the AMF may indicate a range in which the back-off timer C configured with the 111th identification information is effective, or may indicate a range in which congestion control using the back-off timer C configured with the 111th identification information operating in the UE is effective.

Note that, in a case that the AMF uses control plane CIoT 5GS optimization and/or supports control plane CIoT 5GS optimization, the AMF may include the 111th identification information and/or the 112th identification information in the service accept message and/or the service reject message.

In addition, in a procedure such as the registration procedure, in a case that the UE sends out a notification that the UE supports the back-off timer for communication of user data via the control plane and the AMF determines activation of congestion control for communication of user data via the control plane, the AMF may include the 111th identification information and/or the 112th identification information in the service accept message and/or the service reject message. In other words, in a procedure such as the registration procedure, in a case that the AMF receives the 101st identification information from the UE and activates congestion control using the back-off timer C, the AMF may include the 111th identification information and/or the 112th identification information in the service accept message and/or the service reject message. In this case, the 101st identification information may be information indicating support of the back-off timer for communication of user data via the control plane.

In addition, in a case that the AMF includes the 111th identification information and/or the 112th identification information in the service accept message and/or the service reject message, the AMF may store time in which the back-off timer C is operated for each UE. In addition, in a case that the AMF includes the 111th identification information and/or the 112th identification information in the service accept message and/or the service reject message, the AMF may store the effective range of the back-off timer C for each UE.

In contrast, in a case that the AMF determines activation of congestion control for communication of user data via the control plane, the AMF need not include the 111th identification information and/or the 112th identification information in the service accept message. In other words, in a case that the AMF deactivates congestion control using the back-off timer C, the AMF need not include the 111th identification information and/or the 112th identification information in the service accept message.

In addition, in a case that the AMF does not include the 121st identification information and/or the 122nd identification information in the service accept message, the AMF may release the time in which the back-off timer C is operated that is stored for each UE. In addition, in a case that the AMF includes the 121st identification information and/or the 122nd identification information in the service accept message, the AMF may release the effective range of the back-off timer C stored for each UE.

In addition, by transmitting the service accept message, the AMF may indicate that communication of user data via the control plane succeeds. In contrast, by transmitting the service reject message, the AMF may that communication of user data via the control plane does not succeed.

Each apparatus completes the service request procedure, based on completion of the procedure of (A) or (B) of FIG. 7. Note that each apparatus may transition from the idle mode to the connected mode, based on completion of the procedure of (A) of FIG. 7. Alternatively, each apparatus may maintain the idle mode, based on completion of the procedure of (B) of FIG. 7.

In addition, based on completion of the service procedure, each apparatus may perform processing based on information transmitted and/or received in the service request procedure. In addition, based on a reason of rejection of the request from the UE, each apparatus may perform the present procedure again, or may perform the registration procedure with respect to the core network_A and another cell.

In addition, based on completion of the service procedure, the UE may store identification information received together with the service accept message and/or the service reject message, or may recognize determination of the network.

For example, by receiving the service accept message, the UE may recognize that communication of user data via the control plane succeeds. In contrast, by receiving the service reject message, the AMF may recognize that communication of user data via the control plane does not succeed.

In addition, in a case that the UE receives the 111th identification information, the UE may recognize a value indicated by the 111th identification information as a value of the back-off timer C. In addition, in a case that the UE receives the 111th identification information, the UE may configure the value indicated by the 111th identification information for the back-off timer C, or may start the back-off timer C configured with the value indicated by the 111th identification information. Here, in a case that the back-off timer C operates, the UE may stop the back-off timer C, and then start the back-off timer C configured with the value indicated by the 111th identification information.

In other words, in a case that the UE receives the 111th identification information, the UE may start the back-off timer C. Here, in a case that the back-off timer C operates, the UE may stop the back-off timer C, and then start the back-off timer C. Note that, for the back-off timer C, the value indicated by the 111th identification information may be configured, or a value other than the value indicated by the 111th identification information may be configured.

In contrast, in a case that the UE does not receive the 111th identification information in a state in which the back-off timer C operates, the UE may stop the operating back-off timer C. More specifically, in a case that the UE initiates the present procedure in the idle mode and does not receive the 111th identification information, the UE may stop the operating back-off timer C.

Note that, in a case that the UE uses control plane CIoT 5GS optimization, the UE may perform the above-described processing of a case that the UE receives the 111th identification information. In contrast, in a case that the UE does not use control plane CIoT 5GS optimization, the UE may ignore the received 111th identification information.

In addition, in a case that the UE receives the 111th identification information and/or the 112th identification information, the UE may recognize a range to which restriction of communication of user data via the control plane is applied. In other words, in a case that the UE receives the 111th identification information and/or the 112th identification information, the UE may recognize a range in which the back-off timer C configured with the 111th identification information is effective, or may recognize a range in which congestion control using the back-off timer C configured with the 111th identification information is effective.

Note that, in a case that the UE uses control plane CIoT 5GS optimization, the UE may perform the above-described processing of a case that the UE receives the 111th identification information and/or the 112th identification information. In contrast, in a case that the UE does not use control plane CIoT 5GS optimization, the UE may ignore the received 111th identification information and/or 112th identification information.

4. First Embodiment

Next, the first embodiment will be described. The first embodiment is hereinafter referred to as the present embodiment. In addition, a communication procedure according to the present embodiment is referred to as the present procedure.

In the communication procedure according to the present embodiment, the UE performs the registration procedure, and transitions to the registered state. Note that, after completion of the registration procedure, the UE may perform the PDU session establishment procedure to thereby establish a PDU session, so as to transition to a state in which the UE can perform communication using the PDU session with the DN.

Next, through the UE configuration update procedure initiated by the core network, the UE updates configuration information of the UE. Note that the UE may initiate the registration procedure again after completion of the UE configuration update procedure. In addition, in the UE configuration update procedure, each apparatus may change the function being used.

In addition, the UE transitions to the idle mode after a certain time period elapses. In addition, after transitioning to the idle mode, the UE may perform the service request procedure, and transition to the connected mode. Through the above process, the present procedure completes.

In addition, in the present procedure, each apparatus may exchange support information of CIoT 5GS optimization and/or priority information of CIoT 5GS optimization or may negotiate CIoT 5GS optimization to be used, between the UE and the network in the registration procedure. In addition, in the present procedure, each apparatus may exchange information of use restriction of coverage enhancement or may negotiate presence or absence of use restriction of coverage enhancement, between the UE and the network in the registration procedure.

In addition, in the PDU session establishment procedure, each apparatus may establish a PDU session in which CIoT 5GS optimization is supported between the UE and the network, based on information exchanged in the registration procedure. Note that the PDU session in which CIoT 5GS optimization is supported may be a PDU session in which control plane CIoT 5GS optimization can be used, or may be a PDU session in which user plane CIoT 5GS optimization can be used. In addition, the PDU session in which CIoT 5GS optimization is supported may be a PDU session in which Header compression for control plane CIoT 5GS optimization is used.

In addition, in the UE configuration update procedure, each apparatus may update support information of CIoT 5GS optimization and/or priority information of CIoT 5GS optimization stored in the UE, or may change CIoT 5GS optimization to be used. In addition, in the UE configuration update procedure, each apparatus may update information of use restriction of coverage enhancement stored in the UE, or may change presence or absence of use restriction of coverage enhancement. Note that CIoT 5GS optimization to be used and/or use restriction of coverage enhancement may be changed in the registration procedure that is performed after completion of the UE configuration update procedure. In addition, whether CIoT 5GS optimization to be used and/or use restriction of coverage enhancement is changed in the UE configuration update procedure or is changed in the registration procedure that is performed after completion of the UE configuration update procedure may be determined depending on transmitted and/or received identification information.

In addition, the UE may change the state of the back-off timer C in the registration procedure, and/or the service request procedure, and/or the UE configuration update procedure. In other words, in the registration procedure, and/or the service request procedure, and/or the UE configuration update procedure, each apparatus may cause the UE to change the state of the back-off timer C.

Specifically, in a case that the UE receives the configuration update command message not including a value of the back-off timer C in a state in which the UE operates the back-off timer C in the UE configuration update procedure, the UE may stop the operating back-off timer C. In other words, in a case that the UE receives the configuration update command message not including a value of the back-off timer C in a state in which communication of user data via the control plane is restricted in the UE configuration update procedure, the UE may remove the restriction of communication of user data via the control plane.

In contrast, in a case that the UE receives the configuration update command message including a value of the back-off timer C in a state in which the UE does not run the back-off timer C in the UE configuration update procedure, the UE may start the back-off timer C. More specifically, in a case that the UE receives the configuration update command message including a value of the back-off timer C in a state in which the UE does not run the back-off timer C in the UE configuration update procedure, the UE may configure the received value of the back-off timer C for the back-off timer C, or may start the back-off timer C configured with the received value of the back-off timer C. In other words, in a case that the UE receives the configuration update command message not including a value of the back-off timer C in a state in which communication of user data via the control plane is not restricted in the UE configuration update procedure, the UE may start restriction of communication of user data via the control plane.

By transmitting the configuration update command message not including a value of the back-off timer C in the UE configuration update procedure, the core network may command the UE to stop the running back-off timer C. In other words, by transmitting the configuration update command message not including a value of the back-off timer C in a state in which communication of user data via the control plane is restricted in the UE configuration update procedure, the core network may indicate that restriction of communication of user data via the control plane is removed.

In contrast, by transmitting the configuration update command message including a value of the back-off timer C in the UE configuration update procedure, the core network may command the UE to start the back-off timer C. In other words, by transmitting the configuration update command message not including a value of the back-off timer C in the UE configuration update procedure, the core network may indicate that communication of user data via the control plane is restricted, or may indicate that restriction of communication of user data via the control plane continues.

Here, in a case that the UE uses control plane CIoT 5GS optimization, the UE may be allowed to perform communication of user data via the control plane. In other words, in a case that the UE uses control plane CIoT 5GS optimization, the UE may be allowed to start communication of user data via the control plane.

Note that, even in a case that the UE uses control plane CIoT 5GS optimization, the UE may be prohibited from starting communication of user data via the control plane or may be prohibited from starting communication of user data via the control plane, on the condition that the following case applies. Specifically, while the back-off timer C is running, the UE may be prohibited from performing communication of user data via the control plane. In other words, while the back-off timer C is running, the UE may be prohibited from starting communication of user data via the control plane. More specifically, while the UE is in the idle mode and the back-off timer C is running, the UE may be prohibited from starting communication of user data via the control plane.

In addition, the UE may stop the back-off timer C, based on transition to the deregistered state. In addition, the UE may stop the back-off timer C, based on movement to a PLMN that is different from the PLMN in which the back-off timer C is started. In addition, also in a case that the UE is turned off while the back-off timer C is running, the UE may stop the back-off timer C.

The network may reject communication of user data via the control plane started by the UE, based on time in which the stored back-off timer C is run. In other words, in a case that network receives user data via the control plane at time in which the back-off timer C is running in the UE, the network may reject communication of user data via the control plane.

In addition, the network may reject communication of user data via the control plane started by the UE, based on an effective range of the stored back-off timer C and position information of the UE. In other words, in a case that the network receives user data via the control plane in a state in which the UE is located in the effective range of the back-off timer C, the network may reject communication of user data via the control plane. Here, the position information of the UE may be information indicating a PLMN, or may be information indicating a registration area. In addition, the position information of the UE may be information indicating a tracking area, or may be information indicating a cell. Note that the position information of the UE may be information indicating the position of the UE, and need not be limited to these pieces of information.

According to the above, by performing the present procedure, each apparatus can achieve the object of the present procedure. In other words, by performing the present procedure, the core network may be able to achieve the object of the present procedure as initiated by the core network. In addition, by performing the present procedure, the core network may be able to achieve the object of the present procedure without the need of a trigger of the UE. In addition, by performing the present procedure, each apparatus may be able to achieve the object of the present procedure without performing a De-registration procedure. Note that the trigger of the UE may be a request message transmitted from the UE to the core network. For example, the request message transmitted from the UE to the core network may be a registration request message, or may be a service request message.

Here, the object of the present procedure may be to change the state of the back-off timer C in the UE. In other words, the object of the present procedure may be to stop the back-off timer C run by the UE, or may be to start the back-off timer C in the UE.

Note that the registration procedure described in the above corresponds to the registration procedure described in Section 3.2.1. In addition, the PDU session establishment procedure described in the above corresponds to the PDU session establishment procedure described in Section 3.2.2. In addition, the UE configuration update procedure described in the above corresponds to the UE configuration update procedure described in Section 3.2.3. In addition, the service request procedure described in the above corresponds to the service request procedure described in Section 3.2.4.

5. Modified Examples

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a microcontroller, or a state machine instead. The above-mentioned electric circuit may include a digital circuit, or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope not departing from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

The invention claimed is:

1. A User Equipment (UE), comprising:
transmission and reception circuitry;
storage circuitry; and
a controller,
wherein in a case that the transmission and reception circuitry receives a configuration update command message including a second value of a back-off timer from a control apparatus in a core network,
the controller is configured to:
update a first value of the back-off timer stored in the storage circuitry with the second value, and
restrict a start of a service request procedure while the back-off timer using the second value is running, wherein
the back-off timer is a timer that is usable by the UE that supports Control Plane Cellular Internet of Things (CIOT) 5G System (5GS) Optimizations,
the controller is further configured to start the back-off timer in a case that a Non-Access-Stratum (NAS) signaling connection is released, wherein
the NAS signaling connection is a signaling connection between the UE and the core network, and
the service request procedure is a procedure for transitioning a state of the UE from an idle mode to a connected mode.

2. The UE according to claim 1, wherein
in a case that the transmission and reception circuitry receives a registration accept message not including a value of the back-off timer, the controller is further configured to stop the back-off timer that is running.

3. The UE according to claim 1, wherein in a case that the transmission and reception circuitry receives a registration accept message including the first value of the back-off timer, the controller is further configured to store the first value in the storage circuitry.

4. A communication control method performed by a User Equipment (UE), the communication control method comprising:
in a case of receiving a configuration update command message including a second value of a back-off timer from a control apparatus in a core network,
updating a stored first value of the back-off timer with the second value, and
restricting a start of a service request procedure while the back-off timer using the second value is running, wherein
the back-off timer is a timer that is usable by the UE that supports Control Plane Cellular Internet of Things (CIOT) 5G System (5GS) Optimizations,
the method further comprising starting the back-off timer in a case that a Non-Access-Stratum (NAS) signaling connection is released, wherein
the NAS signaling connection is a signaling connection between the UE and the core network, and
the service request procedure is a procedure for transitioning a state of the UE from an idle mode to a connected mode.

* * * * *